United States Patent
Sinzig et al.

(10) Patent No.: US 11,865,667 B2
(45) Date of Patent: Jan. 9, 2024

(54) GRINDING MEANS DEVICE, IN PARTICULAR GRINDING-DISC DEVICE OR BACKUP-PAD DEVICE

(71) Applicant: Robert Bosch GmbH, Stuttgart (DE)

(72) Inventors: Bruno Sinzig, Oberbipp (CH); Stefan Christen, Langendorf (CH); Michael Laett, Solothurn (CH); Laurent Quebatte, Visp (CH); David Winistoerfer, Kriegstetten (CH)

(73) Assignee: Robert Bosch GmbH, Stuttgart (DE)

( * ) Notice: Subject to any disclaimer, the term of this patent is extended or adjusted under 35 U.S.C. 154(b) by 1162 days.

(21) Appl. No.: 16/488,362

(22) PCT Filed: Mar. 13, 2018

(86) PCT No.: PCT/EP2018/056200
§ 371 (c)(1),
(2) Date: Aug. 23, 2019

(87) PCT Pub. No.: WO2018/188870
PCT Pub. Date: Oct. 18, 2018

(65) Prior Publication Data
US 2020/0230776 A1      Jul. 23, 2020

(30) Foreign Application Priority Data

Apr. 12, 2017   (DE) .................... 10 2017 206 339.4
Oct. 18, 2017   (DE) .................... 10 2017 218 622.4

(51) Int. Cl.
*B24B 45/00* (2006.01)

(52) U.S. Cl.
CPC .................................. *B24B 45/006* (2013.01)

(58) Field of Classification Search
CPC ..... B24B 23/022; B24B 45/006; B24B 23/02; B24B 45/00; B23D 45/16; B27B 5/32; B23B 45/02
See application file for complete search history.

(56) References Cited

U.S. PATENT DOCUMENTS

| | | |
|---|---|---|
| 6,523,214 B1 | 2/2003 | Kaiser |
| 8,187,058 B2 * | 5/2012 | Blickle ................. B24B 23/022 |
| | | 451/342 |

(Continued)

FOREIGN PATENT DOCUMENTS

| | | |
|---|---|---|
| CN | 1626311 A | 6/2005 |
| CN | 1652899 A | 8/2005 |

(Continued)

OTHER PUBLICATIONS

International Search Report corresponding to PCT Application No. PCT/EP2018/056200, dated Jul. 11, 2018 (German and English language document) (5 pages).

*Primary Examiner* — Eric A. Gates
(74) *Attorney, Agent, or Firm* — Maginot, Moore & Beck LLP

(57) ABSTRACT

A grinding-means device, in particular a grinding-disc device or backup-pad device, for arranging at least one grinding means, in particular at least one grinding wheel, on a portable power tool, in particular a grinding machine, includes at least one receiving unit, in particular a grinding disc or backup pad, which is fixable in a thread-free manner on an output unit of the tool and on which at least one grinding means is arranged. The grinding-means device includes at least one securing unit formed separately from the receiving unit and configured to axially fix the receiving unit and/or the grinding means to the output unit of the tool (Continued)

in a tool-free manner, and/or at least to axially fix the grinding means to the receiving unit in a tool-free manner.

20 Claims, 7 Drawing Sheets

(56) References Cited

U.S. PATENT DOCUMENTS

| | | | | |
|---|---|---|---|---|
| 9,067,293 | B2* | 6/2015 | Bernardi | B24B 23/022 |
| 9,486,887 | B2* | 11/2016 | Fankhauser | B23Q 3/12 |
| 9,486,934 | B2* | 11/2016 | Zhou | B23Q 3/14 |
| 9,694,472 | B2* | 7/2017 | Luescher | B24B 45/006 |
| 10,052,695 | B2* | 8/2018 | Klabunde | B23B 31/008 |
| 10,471,518 | B2* | 11/2019 | Klabunde | B23B 31/103 |
| 10,828,742 | B2* | 11/2020 | Luescher | B27B 5/32 |
| 11,052,564 | B2* | 7/2021 | Fellmann | B23B 51/0473 |
| 11,154,974 | B2* | 10/2021 | Wang | F16H 21/40 |
| 2013/0180747 | A1* | 7/2013 | Brown | B25B 21/00 |
| | | | | 173/145 |
| 2014/0110908 | A1* | 4/2014 | Fankhauser | A61B 17/142 |
| | | | | 279/141 |
| 2014/0182873 | A1 | 7/2014 | Fankhauser et al. | |
| 2015/0035239 | A1* | 2/2015 | Maissen | B23D 51/10 |
| | | | | 279/141 |
| 2015/0075830 | A1* | 3/2015 | Zhang | B24B 23/022 |
| | | | | 173/213 |
| 2019/0202027 | A1* | 7/2019 | Fellmann | B24B 45/006 |
| 2019/0262970 | A1* | 8/2019 | Luescher | B24B 23/02 |
| 2020/0094373 | A1* | 3/2020 | Luescher | B25F 5/00 |
| 2020/0164485 | A1* | 5/2020 | Sinzig | B24B 45/006 |
| 2021/0053176 | A1* | 2/2021 | Di Nicolantonio | B24B 23/022 |

FOREIGN PATENT DOCUMENTS

| | | | | |
|---|---|---|---|---|
| CN | 1688418 A | 10/2005 | | |
| CN | 100553882 | 10/2009 | | |
| CN | 102481643 A | 5/2012 | | |
| CN | 103501962 A | 1/2014 | | |
| CN | 104227131 A | 12/2014 | | |
| DE | 10 2011 075 228 A1 | 11/2012 | | |
| DE | 102012007931 A1 * | 10/2013 | | B24B 23/022 |
| EP | 1790434 A1 * | 5/2007 | | B24B 23/022 |
| EP | 2 632 634 B1 | 9/2013 | | |
| JP | S54-110895 U | 8/1979 | | |
| JP | 2013-500871 A | 1/2013 | | |
| RU | 2 400 345 C2 | 2/2010 | | |
| RU | 2 588 909 C2 | 12/2014 | | |
| SU | 1 710 315 A1 | 2/1992 | | |
| TW | 201605574 | 2/2016 | | |
| WO | 01/14100 A1 | 3/2001 | | |
| WO | 01/96067 A1 | 12/2001 | | |
| WO | 2011/014914 A1 | 2/2011 | | |

* cited by examiner

GRINDING MEANS DEVICE, IN PARTICULAR GRINDING-DISC DEVICE OR BACKUP-PAD DEVICE

This application is a 35 U.S.C. § 371 National Stage Application of PCT/EP2018/056200, filed on Mar. 13, 2018, which claims the benefit of priority to Serial No. DE 10 2017 206 339.4, filed on Apr. 12, 2017 in Germany and which claims the benefit of priority to Serial No. DE 10 2017 218 622.4, filed on Oct. 18, 2017 in Germany, the disclosures of which are incorporated herein by reference in their entirety.

BACKGROUND

Grinding means devices, in particular grinding-disk devices or backup-pad devices, of at least one grinding means, in particular of at least one grinding wheel, on a portable machine tool, in particular on a grinding machine, are already known. The known grinding means devices comprise at least one receiving unit, in particular grinding disk or backup pad, which is fixable by means of a thread on an output unit of the portable machine tool and on which at least one grinding means can be arranged, and at least one securing unit, formed in particular separately from the receiving unit, at least for axially fixing the receiving unit and/or the grinding means on the output unit of the portable machine tool. In the known grinding means devices, the securing unit is in the form of a spindle nut, for example, which can be screwed by means of a tool onto a thread of an output spindle of the output unit of the portable machine tool to axially fix the receiving unit and/or the grinding means.

SUMMARY

The disclosure proceeds from a grinding means device, in particular from a grinding-disk device or from a backup-pad device, for arranging at least one grinding means, in particular at least one grinding wheel, on a portable machine tool, in particular a grinding machine, having at least one receiving unit, in particular a grinding disk or a backup pad, which is fixable in particular in a thread-free manner on an output unit of the portable machine tool and on which at least one grinding means can be arranged, and having at least one securing unit, formed in particular separately from the receiving unit, at least for axially fixing the receiving unit and/or the grinding means on the output unit of the portable machine tool.

It is proposed that the securing unit be provided at least to axially fix the receiving unit and/or the grinding means on the output unit of the portable machine tool in a tool-free manner, and/or at least to axially fix the grinding means on the receiving unit in a tool-free manner. Preferably, the securing unit is provided to axially fix at least the receiving unit and/or the grinding means on the output unit by means of a form-fitting and/or force-fitting connection, in particular at least between the securing unit and a movable hook jaw of a gripping device of a quick-release clamping device of the portable machine tool, as a result of a slide-on movement and/or an insertion movement onto and/or into the output unit, in particular with or without a subsequent rotary movement of the securing unit. The quick-release clamping device is preferably arranged on the output unit, in particular on or at least partially in a spindle of the output unit, or the quick-release clamping device is a part of the output unit. "Provided" is intended to mean in particular specifically designed and/or specifically equipped. The fact that an element and/or a unit is provided for a particular function is intended to mean in particular that the element and/or the unit provide/provides and/or carry/carries out this particular function in at least one use state and/or operating state. Preferably, the securing unit is provided to be arranged on the output unit as a result of a movement, in particular a slide-on movement and/or an insertion movement, of the securing unit, said movement running at least substantially parallel to a rotation axis of the receiving unit, in order to axially fix the receiving unit and/or the grinding means on the output unit. However, it is also conceivable for the securing unit to be provided to be moved in a different direction which seems practical to a person skilled in the art relative to the rotation axis of the receiving unit, in order to axially fix the receiving unit and/or the grinding means on the output unit, such as, for example, in a direction transverse, in particular at least substantially perpendicular, to the rotation axis of the receiving unit. "At least substantially parallel" in this case is intended to mean in particular an orientation of a direction relative to a reference direction, in particular in a plane, the direction having a deviation of in particular less than 8°, advantageously less than 5°, and particularly advantageously less than 2°, relative to the reference direction. Also, "at least substantially perpendicular" in this case is intended to define in particular an orientation of a direction relative to a reference direction, the direction and the reference direction, in particular viewed in a plane, forming an angle of 90°, and the angle having a maximum deviation of in particular less than 8°, advantageously less than 5°, and particularly advantageously less than 2°.

The grinding means device is preferably in the form of a grinding means holding device for holding at least one grinding means, such as, for example, a grinding-disk device or a backup-pad device. The receiving unit of the grinding means device can preferably be arranged removably on the output unit, in particular on a spindle of the output unit and/or on a quick-release clamping device, arranged on the spindle, of the output unit.

Preferably, the receiving unit can be removed from the output unit after undoing a fixing, in particular by removing the securing unit from the receiving unit and/or from the output unit, in a tool-free manner, in particular at least separately from a screwing process. Alternatively or additionally, it is conceivable for the receiving unit to have at least one securing element, which is in particular arranged on a main body of the receiving unit and is provided to prevent undesired detachment of the receiving unit from the output unit, in particular to prevent the receiving unit falling off due to gravity after a fixing on the output unit has been undone. The securing element of the receiving unit can be in the form of a force-fitting element and/or a form-fitting element, such as, for example, a rubber element, in particular O-ring, which can be placed on the spindle, a spring-elastic snap element, a securing clip or the like, which is provided in particular in addition to the securing unit to apply a holding force to hold the receiving unit on the output unit.

The securing unit is preferably provided to interact with a quick-release clamping device of the output unit, in particular at least with at least one movably mounted hook jaw of a gripping device of the quick-release clamping device of the output unit of the portable machine tool, at least to axially fix the receiving unit and/or the grinding means on the output unit of the portable machine tool. Preferably, the receiving unit and the grinding means can be fixed, in particular together, at least axially on the output unit, in particular on the gripping device, which is arranged on a spindle, in particular a hollow spindle, of the output unit, by means of an interaction of the securing unit with the at least one movably mounted hook jaw of the gripping device of the quick-release clamping device of the output unit of the portable machine tool. However, it is also, in particular alternatively, conceivable for the securing unit to be designed such that the securing unit has at least one securing element which can be operated in a tool-free manner and has for axial fixing of the receiving unit on the output unit at least one further securing element which can be operated in a tool-free manner and is provided for axial fixing of the grinding means on the receiving unit. It is also conceivable, in particular alternatively, for the receiving unit to have a fixing element which interacts in a form-fitting and/or force-fitting manner with the gripping device of the quick-release clamping device of the portable machine tool for axial fixing of the receiving unit on the output unit, and the securing unit to be provided, in particular only, to axially fix the grinding means on the receiving unit.

The term "fixing/operation in a tool-free manner" is intended in particular to define fixing/operation of at least one element and/or of at least one unit, wherein the fixing/operation is in particular separate from an additional operating tool, such as, for example, a screwdriver, a wrench etc. Preferably, the securing unit can be transferred by an operator from a fixing position to a releasing position and vice versa, at least to axially fix the receiving unit and/or the grinding means on the output unit of the portable machine tool separately from an additional operating tool such as, for example, a screwdriver, a wrench etc. Preferably, the securing unit can be transferred manually by an operator from a fixing position to a releasing position and vice versa. The term "fixable in a thread-free manner" is intended to define in particular fixing of at least one element and/or at least one unit to at least one further element and/or to at least one further unit, said fixing being realizable independently of a mutual engagement of threads of the elements and/or units which can be fastened to each other. Preferably, the receiving unit is formed so as to be free of a thread for fixing of the receiving unit on the output unit. Preferably, the securing unit is formed so as to be free of a thread for fixing of the receiving unit and/or the grinding means on the output unit.

The receiving unit preferably comprises a grinding means bearing face on which at least one grinding means can be placed. Preferably, at least one grinding means which is arranged on the grinding means bearing face can be fixed on the grinding means bearing face by means of the securing unit, in particular as a result of an interaction of the securing unit with the gripping device. Preferably, at least one grinding means which is fixed on the grinding means bearing face by means of the securing unit is arranged, in particular clamped, between the receiving unit and the securing unit, in particular in a direction running at least substantially parallel to the rotation axis of the receiving unit. Preferably, the securing unit comprises at least one clamping face, by means of which at least one grinding means arranged on the receiving unit, in particular on the grinding means bearing face of the receiving unit, can be pressed against the grinding means bearing face of the receiving unit.

By means of the design according to the disclosure, a grinding means device which is simple and convenient to operate, for arranging at least one grinding means on an output unit of a portable machine tool, can advantageously be realized. Advantageously, a high degree of operating convenience can be achieved, in particular since fixing of at least one grinding means on the receiving unit and/or on the output unit can be realized separately from an additional operating tool. Advantageously, rapid changing of at least one grinding means arranged on the receiving unit can be realized.

Furthermore, it is proposed that the securing unit comprise at least one axial securing element which engages at least partially in the receiving unit, in particular in a receiving recess of the receiving unit, to axially fix the receiving unit and/or the grinding means in a tool-free manner. The receiving recess of the receiving unit is preferably provided to at least partially receive the output unit, in particular the gripping device, and/or the securing unit. Preferably, the securing unit, in particular when the securing unit is arranged on the receiving unit, can be arranged at least mostly inside the receiving unit, in particular inside the receiving recess. "Mostly" is intended to mean in particular at least more than 50%, preferably at least more than 75%, and particularly preferably at least more than 90% of a reference value, in particular of a total volume. Preferably, the output unit, in particular the gripping device, when the receiving unit is arranged on the output unit, is arranged at least partially in the receiving recess. In particular, the axial securing element is provided, when the receiving unit and the securing unit are arranged on the output unit, to interact in a form-fitting manner with the gripping device at least partially inside the receiving recess of the receiving unit. Preferably, the axial securing element is in the form of a projection which has at least one portion, in particular snap region, which extends transversely, in particular at least substantially perpendicular, to a center axis, in particular to a rotation axis, of the securing unit. Preferably, the portion which extends transversely, in particular at least substantially perpendicular, to the center axis, in particular to the rotation axis, of the securing unit is provided to interact in a form-fitting manner with the gripping device, in particular the at least one hook jaw. Preferably, the portion which extends at least transversely, in particular at least substantially perpendicular, to the center axis, in particular to the rotation axis, of the securing unit is provided to engage in a form-fitting manner in the gripping device, in particular in the at least one hook jaw. By means of the design according to the disclosure, a secure axial fixing of the receiving unit by means of the securing unit can advantageously be realized. Advantageously, secure protection of the securing unit, in particular of the at least one axial securing element, can be realized at least when the securing unit is arranged on the receiving unit. A grinding means device which is simple and convenient to operate, for arranging at least one grinding means on an output unit of a portable machine tool, can advantageously be realized. Advantageously, a high degree of operating convenience can be achieved, in particular since fixing of at least one grinding means on the receiving unit and/or on the output unit can be realized separately from an additional operating tool. Advantageously, rapid changing of at least one grinding means arranged on the receiving unit can be realized.

It is also proposed that the securing unit comprise at least one axial securing element which is configured to be deflectable in a spring-elastic manner. The axial securing element can be formed integrally with a main body of the securing unit or be formed separately from the main body and in particular be fixed on the main body by means of a connection, in particular a form-fitting and/or force-fitting connection, which seems practical to a person skilled in the art. "Integrally" is intended to mean in particular at least integrally joined, for example by a welding process, an adhesive bonding process, an injection-molding process and/or another process which seems practical to a person skilled in the art, and/or advantageously to mean molded in one piece, such as, for example, by production by casting and/or by production in a single- or multi-component injection-molding method and advantageously from a single blank. The axial securing element is preferably formed from a metal or from a metal alloy, such as, for example, spring steel or the like. However, it is also conceivable for the axial securing element to be formed from another material which seems practical to a person skilled in the art, such as, for example, a plastic or the like. However, it is also, in particular alternatively, conceivable for the securing unit to have at least one axial securing element mounted movably on the main body and at least one spring element which applies a spring force to the axial securing element. The design according to the disclosure advantageously allows a secure fixing of the receiving unit and/or the securing unit on the output unit. An advantageous snap function can advantageously be realized as a result of the ability of the axial securing element to deflect elastically. It can advantageously be ensured that the axial securing element is reliably pressed against the gripping device. A form-fitting and/or force-fitting connection between the axial securing element and the gripping device can advantageously be prevented from inadvertently coming undone, since an advantageous holding force can be realized as a result of the ability of the axial securing element to deflect elastically. A grinding means device which is simple and convenient to operate, for arranging at least one grinding means on an output unit of a portable machine tool, can advantageously be realized. Advantageously, a high degree of operating convenience can be achieved, in particular since fixing of at least one grinding means on the receiving unit and/or on the output unit can be realized separately from an additional operating tool. Advantageously, rapid changing of at least one grinding means arranged on the receiving unit can be realized.

In addition, it is proposed that the securing unit comprise at least one axial securing element which is movably mounted on a main body of the securing unit. The expression "movably mounted" in this case is intended to define in particular a mounting of a unit and/or of an element, wherein the unit and/or the element has the ability, in particular separately from an elastic deformation of the unit and/or of the element, to move along at least a distance greater than 0.1 mm, preferably greater than 0.5 mm and particularly preferably greater than 1 mm and/or to move about at least one axis by an angle greater than 2.5°, preferably greater than 5° and particularly preferably greater than 10°. The at least one axial securing element can be mounted on the main body of the securing unit such that it can move translationally and/or rotationally. A movement axis of the at least one axial securing element can run at least substantially parallel, in particular coaxially, or transversely, in particular at least substantially perpendicular, to the center axis, in particular to a rotation axis, of the securing unit. It is also conceivable for the securing unit to have a number of axial securing elements other than one, which are mounted on the main body of the securing unit such that they can move, in particular move translationally and/or rotationally. By means of the design according to the disclosure, a secure axial fixing of the receiving unit by means of the securing unit can advantageously be realized. Advantageously, reliable fixing of the receiving unit on the main body of the securing unit can be realized by means of the securing unit as a result of a possibility of compensating play and/or insert tool thickness by the movable mounting of the at least one axial securing element.

Furthermore, it is proposed that the main body of the securing unit have at least one movement-guiding element, in particular a guide groove, which is provided to guide the at least one axial securing element during a movement relative to the main body of the securing unit. Preferably, the movement-guiding element is in the form of a guide groove. Preferably, the movement-guiding element in the form of a guide groove is at least partially delimited by at least one form-fitting element which is in particular arranged on the main body and is provided to transmit a drive force and/or a drive torque to the grinding means. Preferably, the movement-guiding element in the form of a guide groove is delimited at least partially by the at least one form-fitting element, in particular arranged on the main body, and at least one insertion projection of the securing unit, in particular arranged on the main body. However, it is also conceivable for the movement-guiding element to have another design which seems practical to a person skilled in the art, such as, for example, a design as a guide projection or the like, to guide the at least one axial securing element. It is also conceivable for the movement-guiding element and/or the axial securing element to be provided with at least one friction-reducing element, such as, for example, with a sliding layer or the like, which is provided to minimize friction between the movement-guiding element and the axial securing element. By means of the design according to the disclosure, reliable guiding of the axial securing element can advantageously be realized during a movement of the axial securing element relative to the main body. A secure axial fixing of the receiving unit by means of the securing unit can advantageously be realized. Advantageously, reliable fixing of the receiving unit on the main body of the securing unit can be realized by means of the securing unit as a result of a possibility of compensating play and/or insert tool thickness by the movable mounting of the at least one axial securing element.

Furthermore, it is proposed that the main body of the securing unit have at least one movement-limiting element which is provided to limit a maximum movement distance of the at least one axial securing element relative to the main body of the securing unit. Preferably, the at least one movement-limiting element is in the form of a projection. However, it is also conceivable for the at least one movement-limiting element to have another design which seems practical to a person skilled in the art, such as, for example, a design as a baseplate element of the main body of the securing unit or the like. Preferably, the at least one movement-limiting element extends transversely, in particular at least substantially perpendicular, to the center axis, in particular to a rotation axis, of the securing unit. Preferably, the main body of the securing unit comprises at least two movement-limiting elements which are provided together to limit a maximum movement distance of the at least one axial securing element relative to the main body of the securing unit. By means of the design according to the disclosure, the axial securing element can advantageously be arranged on the main body in a loss-proof manner. A secure axial fixing of the receiving unit by means of the securing unit can advantageously be realized. Advantageously, reliable fixing of the receiving unit on the main body of the securing unit can be realized by means of the securing unit as a result of a possibility of compensating play and/or insert tool thickness by the movable mounting of the at least one axial securing element.

It is also proposed that the receiving unit have at least one torque-transmitting element, which is provided at least to interact with a torque-transmitting projection of the portable machine tool, in the vicinity of a receiving recess in which the securing unit at least partially engages. Preferably, the torque-transmitting element and the torque-transmitting projection can be connected to each other as a result of a slip-on and/or slide-on movement of the receiving unit onto the quick-release clamping device. The torque-transmitting projection of the portable machine tool is preferably in the form of a driver face of a driver device of the quick-release clamping device. By means of the design according to the disclosure, a simply designed transmission of a torque for rotationally driving the receiving unit can advantageously be realized. A grinding means device which is simple and convenient to operate, for arranging at least one grinding means on an output unit of a portable machine tool, can advantageously be realized. Advantageously, a high degree of operating convenience can be achieved, in particular since fixing of at least one grinding means on the receiving unit and/or on the output unit can be realized separately from an additional operating tool. Advantageously, rapid changing of at least one grinding means arranged on the receiving unit can be realized.

Furthermore, it is proposed that the receiving unit have at least one torque-transmitting element which has at least one bearing face which runs at least substantially parallel to a radial direction of the receiving unit. The torque-transmitting element preferably comprises a bearing face which is provided, when the receiving unit is arranged on the output unit of the portable machine tool, to bear against the torque-transmitting projection. The bearing face of the torque-transmitting element preferably runs at least substantially parallel to a radial direction of the receiving unit, in particular running through the rotation axis of the receiving unit. Preferably, the bearing face of the torque-transmitting element is arranged offset relative to the radial direction of the receiving unit, in particular running through the rotation axis of the receiving unit. Preferably, the bearing face of the torque-transmitting element has a maximum distance, in particular running perpendicular to the bearing face, from the radial direction of the receiving unit, in particular running through the rotation axis of the receiving unit, which is in particular less than 10 mm, preferably less than 8 mm, particularly preferably less than 7 mm, and very particularly preferably greater than 5 mm. By means of the design according to the disclosure, a reliable transmission of a torque for rotationally driving the receiving unit can advantageously be realized. A simply designed transmission of a torque for rotationally driving the receiving unit can advantageously be realized. Advantageously, a high degree of operating convenience can be achieved, in particular since fixing of at least one grinding means on the receiving unit and/or on the output unit can be realized separately from an additional operating tool. Advantageously, rapid changing of at least one grinding means arranged on the receiving unit can be realized.

It is also proposed that the receiving unit have at least one receiving recess in which the securing unit at least partially engages, wherein at least one edge region of the receiving unit, said edge region at least partially delimiting the receiving recess, forms at least one contact face for transmitting a drive force and/or a drive torque to the securing unit. The contact face is preferably arranged offset relative to the bearing face of the torque-transmitting element, in particular in a direction running at least substantially parallel to the rotation axis of the receiving unit. The contact face preferably runs transversely to the bearing face of the torque-transmitting element. In particular, the contact face and the bearing face are inclined relative to each other, in particular by an angle of less than 40°, preferably less than 30°, and particularly preferably less than 26°, in particular in a circumferential direction of the receiving unit, running around the rotation axis of the receiving unit. The contact face preferably runs at least substantially parallel to a radial direction of the receiving unit, in particular running through the rotation axis of the receiving unit. Preferably, the contact face has a maximum distance, in particular running perpendicular to the contact face, from the radial direction of the receiving unit, in particular running through the rotation axis of the receiving unit, which is in particular less than 8 mm, preferably less than 6 mm, particularly preferably less than 5 mm, and very particularly preferably greater than 4 mm. By means of the design according to the disclosure, a reliable transmission of a torque from the receiving unit to the securing unit can advantageously be realized. Rotational driving of the securing unit can be realized in a simply designed manner, in particular a connection for conjoint rotation between the receiving unit and the securing unit. A simply designed transmission of a torque for rotationally driving the receiving unit together with the securing unit can advantageously be realized. Advantageously, a high degree of operating convenience can be achieved, in particular since fixing of at least one grinding means on the receiving unit and/or on the output unit can be realized separately from an additional operating tool. Advantageously, rapid changing of at least one grinding means arranged on the receiving unit can be realized.

It is also proposed that the receiving unit have at least one positioning recess for positioning the securing unit, wherein the positioning recess is arranged adjacent to a receiving recess of the receiving unit which is at least partially delimited by at least one edge region of the receiving unit which is provided for transmitting a drive force and/or a drive torque to the securing unit. The positioning recess preferably has a shape formed correspondingly to a profile of a total outer periphery of, in particular of the securing unit a total outer periphery running in at least one plane extending at least substantially perpendicular to the center axis, in particular to the rotation axis, of the securing unit. Preferably, the positioning recess is configured to be round, in particular circular. However, it is also conceivable for the positioning recess to have a different design which seems practical to a person skilled in the art, in particular depending on a design of a profile of a total outer periphery of the securing unit, such as, for example, a polygonal design with or without teeth or the like. Preferably, the positioning recess has a maximum transverse extent, in particular a diameter, which is in particular less than 50 mm, preferably less than 45 mm, particularly preferably less than 36 mm, and very particularly preferably greater than 34 mm. Preferably, the positioning recess has a maximum depth of in particular less than 10 mm, preferably less than 8 mm, particularly preferably less than 6 mm, and very particularly preferably more than 1 mm. Preferably, the securing unit is arranged at least partially inside the positioning recess when arranged on the receiving unit. The receiving unit preferably has an insertion ramp in a transition region between the positioning recess, in particular a connecting face, delimiting the positioning recess in the direction of the rotation axis, of the receiving unit for contact with the securing unit, and the contact face. The insertion ramp is preferably angled toward the connecting face of the receiving unit and/or toward the contact face. Preferably, the insertion ramp and the connecting face of the receiving unit form an angle which corresponds to a value within a value range of 30° to 60°, in particular a value of 45°. By means of the design according to the disclosure, a largely play-free connection between the receiving unit and the securing unit can advantageously be realized. A precise bearing of the securing unit against the receiving unit can advantageously be realized. It can advantageously be ensured that the securing unit, when connected to the receiving unit, can be placed precisely against the receiving unit, in particular to ensure secure contact between the gripping device and the securing unit for reliable axial fixing of the receiving unit and/or of the grinding means on the output unit. Advantageously, a high degree of operating convenience can be achieved, in particular since fixing of at least one grinding means on the receiving unit and/or on the output unit can be realized separately from an additional operating tool. Advantageously, rapid changing of at least one grinding means arranged on the receiving unit can be realized.

Furthermore, it is proposed that the securing unit have at least one form-fitting element for transmitting a drive force and/or a drive torque to the grinding means. The form-fitting element is preferably in the form of a projection. The form-fitting element is preferably arranged on the main body of the securing unit. The form-fitting element is preferably provided to engage in a correspondingly shaped form-fitting recess in the grinding means, in particular when the grinding means is fixed axially on the receiving unit and/or the output unit by means of the securing unit. By means of the design according to the disclosure, a secure and reliable transmission of a torque to the grinding means for rotationally driving the grinding means together with the receiving unit and/or the securing unit can advantageously be realized. A relative movement between the securing unit and the grinding means can advantageously be counteracted.

It is also proposed that the form-fitting element be arranged on a clamping face of the securing unit which can be placed against the grinding means to axially fix the grinding means on the receiving unit and/or on the output unit. The clamping face is arranged on a side of the securing unit facing the receiving unit when the securing unit is arranged on the receiving unit and/or on the output unit. Preferably, the clamping face is arranged, in particular directly, adjacent to the form-fitting element on the main body of the securing unit. Preferably, the clamping face and the at least one form-fitting element are integrally joined to each other, in particular formed in one piece. Preferably, the clamping face is inclined relative to the center axis, in particular to the rotation axis, of the securing unit. The clamping face and a plane extending at least substantially perpendicular to the center axis, in particular to the rotation axis, of the securing unit preferably form an angle which corresponds to a value within an angle range between 10° and 35°, in particular corresponds to a value within an angle range between 15° and 25°. By means of the design according to the disclosure, reliable fixing of at least one grinding means on the receiving unit and/or on the output unit can advantageously be realized. Application of an axial clamping force to fix the grinding means on the receiving unit by means of a form-fitting and/or force-fitting connection can advantageously be realized.

In addition, a grinding means, in particular a grinding wheel, is proposed, which can be fixed on a portable machine tool, in particular a grinding machine, by means of a grinding means device according to the disclosure. The grinding means is preferably in the form of a grinding wheel, in particular a fiber wheel. The grinding means is preferably configured to be at least partially abrasive. The grinding means preferably has a grinding layer which is configured to be at least partially abrasive. The grinding means, in particular the grinding layer, can contain for example quartz, corundum, emery, pumice, garnet, natural diamonds, synthetic corundum (Al2O3), silicon carbide (SiC), cubic boron nitride (cBN), synthetically produced diamond or the like. However, it is also conceivable for the grinding means to comprise another material which seems practical to a person skilled in the art and can be used to remove material from a workpiece, in particular for a grinding process. Preferably, the grinding layer bears against the clamping face of the securing unit when the grinding means is fixed on the receiving unit and/or on the output unit by means of the securing unit. A side of the grinding means facing away from the grinding layer bears against the grinding means bearing face of the receiving unit when the grinding means is fixed on the receiving unit and/or on the output unit by means of the securing unit. Rapid changing of at least one grinding means arranged on the receiving unit can advantageously be realized by means of the design of the grinding means according to the disclosure. Advantageously, a high degree of operating convenience can be achieved, in particular since fixing of at least one grinding means on the receiving unit and/or on the output unit can be realized separately from an additional operating tool.

Furthermore, it is proposed that the grinding means comprise at least one coupling unit for connecting to the securing unit of the grinding means device, wherein the coupling unit has at least two differently designed connecting elements, in particular connecting recesses. Preferably, the connecting elements each have a main extension axis, which each run at least substantially perpendicular to a grinding means rotation axis of the grinding means. Preferably, the differently designed connecting elements are arranged alternately in a circumferential direction of the grinding means. However, it is also conceivable for the differently designed connecting elements to be arranged on the grinding means in the circumferential direction of the grinding means in another manner which seems practical to a person skilled in the art. Preferably, the differently designed connecting elements are arranged on the grinding means according to an n-fold symmetry. A particularly advantageous adaptation of the function of the connecting elements to different functions can be realized by means of the design of the grinding means according to the disclosure. Advantageously, rapid changing of at least one grinding means arranged on the receiving unit can be realized.

It is also proposed that the at least two differently designed connecting elements at least have different maximum width extensions. The width extension of each individual connecting element preferably runs at least substantially perpendicular to the main extension axis of the connecting element in question. Advantageously, one of the connecting elements can be provided to receive the form-fitting element of the securing unit, while a further one of the connecting elements is provided for positioning the securing unit on the grinding means. A retrospective compatibility of the grinding means according to the disclosure can advantageously be made possible, in particular to allow the grinding means according to the disclosure to be arranged on already known grinding means devices.

In addition, an insert tool having a grinding means device according to the disclosure and having a grinding means according to the disclosure which can be arranged on the grinding means device according to the disclosure is proposed. The insert tool can preferably be arranged, in particular fixed, removably on an output unit of a portable machine tool. An insert tool which is simple to handle can advantageously be realized by means of the design according to the disclosure.

Furthermore, a machine tool system having at least one portable machine tool, in particular a grinding machine, and having at least one insert tool according to the disclosure which can be fixed on an output unit of the portable machine tool by means of a quick-release clamping device of the portable machine tool is proposed. A "portable machine tool" in this case is intended to mean in particular a machine tool for machining workpieces which can be transported by an operator without using a transporting machine. The portable machine tool in particular has a weight less than 40 kg, preferably less than 10 kg, and particularly preferably less than 5 kg. The portable machine tool is particularly preferably in the form of an angle-grinding machine. However, it is also conceivable for the portable machine tool to have another design which seems practical to a person skilled in the art, such as, for example, a design as a drill, as a multifunctional machine with a spindle that can be driven in an oscillating manner, or the like. By means of the design according to the disclosure, a machine tool system can advantageously be provided which allows a particularly high level of operating convenience.

The grinding means device according to the disclosure, the grinding means according to the disclosure, the insert tool according to the disclosure and/or the machine tool system according to the disclosure are not intended to be limited here to the above-described use and embodiment. In particular, the grinding means device according to the disclosure, the grinding means according to the disclosure, the insert tool according to the disclosure and/or the machine tool system according to the disclosure can have a number of individual elements, components and units as well as method steps which differs from a number mentioned herein to provide an operating principle described herein. In addition, with the value ranges given in this disclosure, values lying within the stated limits should also be regarded as disclosed and usable as desired.

BRIEF DESCRIPTION OF THE DRAWINGS

Further advantages can be found in the description of the drawing below. The drawing shows exemplary embodiments of the disclosure. The drawing, the description and the claims contain numerous features in combination. A person skilled in the art will expediently also consider the features individually and combine them to form practical further combinations.

In the figures.

DETAILED DESCRIPTION

Figure 1:
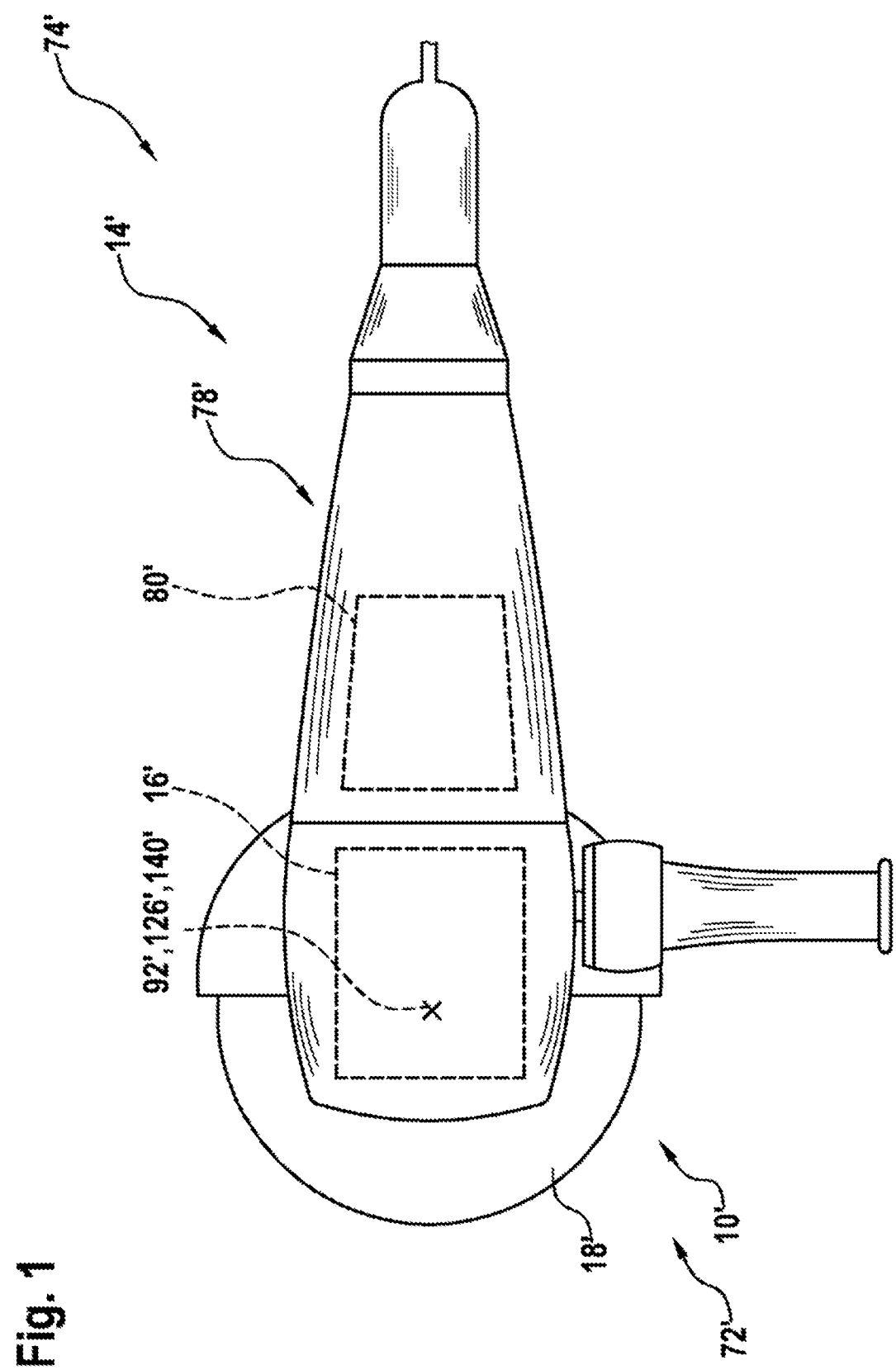
FIG. 1 shows a schematic diagram of a machine tool system according to the disclosure having at least one portable machine tool, in particular an angle-grinding machine, and having an insert tool according to the disclosure arranged on an output unit of the portable machine tool.

FIG. 1 shows a machine tool system 74' having at least one portable machine tool 14', in particular a grinding machine, and having at least one insert tool 72' arranged on an output unit 16' of the portable machine tool 14'. The portable machine tool 14' is preferably in the form of an angle-grinding machine. The portable machine tool 14' preferably has a housing unit 78' for receiving and/or supporting a drive unit 80', in particular an electric motor unit, and the output unit 16' of the portable machine tool 14' in a manner already known to a person skilled in the art. The drive unit 80' is provided to drive the insert tool 72' in a manner already known to a person skilled in the art, in particular in a rotary manner, via the output unit 16' when arranged on the output unit 16'. The insert tool 72' can be fixed on the output unit 16' of the portable machine tool 14' by means of a quick-release clamping device 76' of the portable machine tool 14'. The quick-release clamping device 76' is preferably arranged on a spindle, in particular on a hollow spindle, of the output unit 16'. The quick-release clamping device 76' is preferably connected for conjoint rotation with the spindle, in particular with the hollow spindle, of the output unit 16'.

Figure 2:
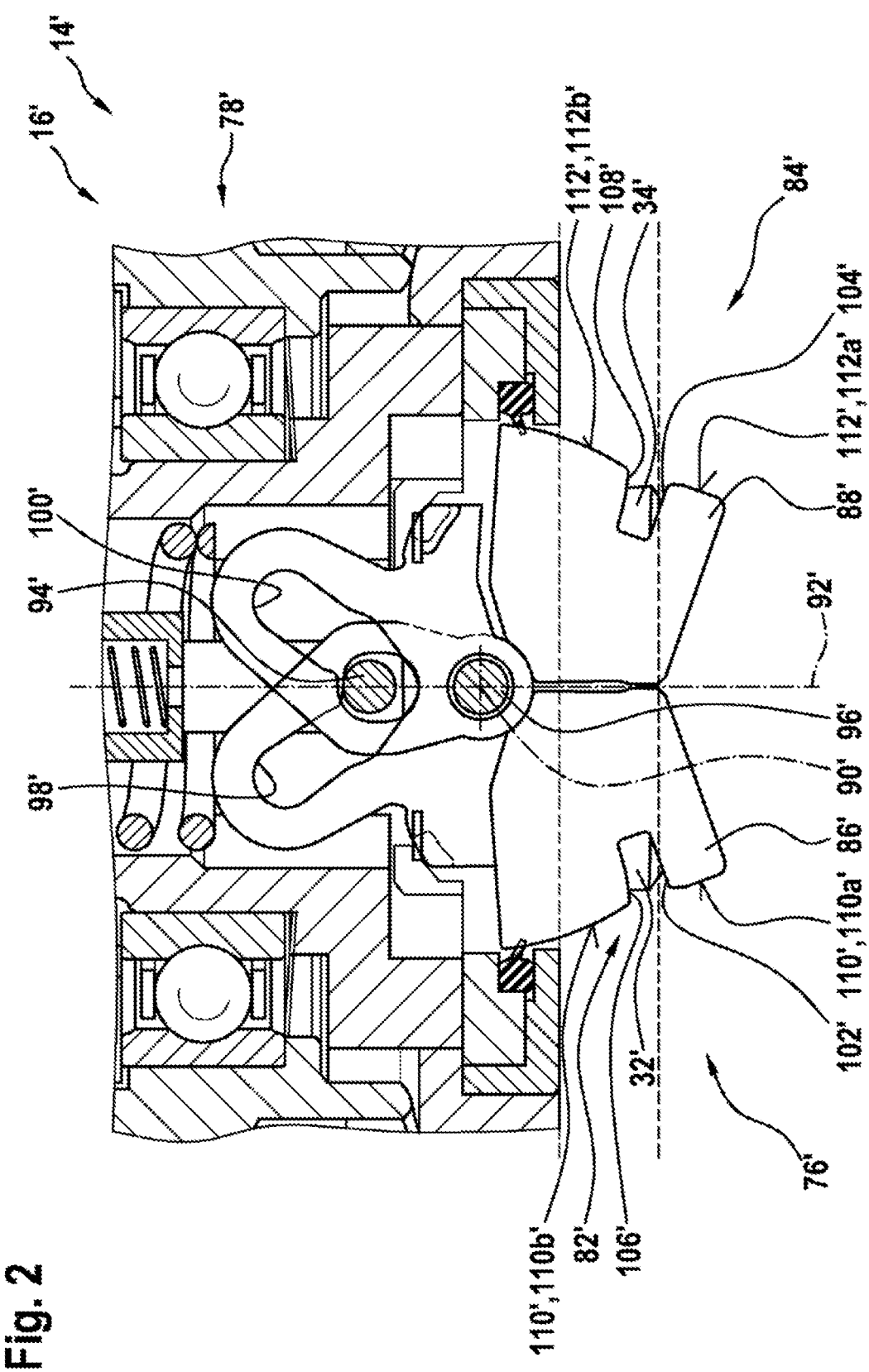
FIG. 2 shows a schematic diagram of a sectional view through a quick-release clamping device, arranged on the output unit, of the portable machine tool, in a released state.

FIG. 2 shows a sectional view through the quick-release clamping device 76' arranged on the output unit 16'. The quick-release clamping device 76' comprises at least one driver device 82' and a gripping device 84' which is movable relative to the driver device 82'. The gripping device 84' preferably has at least two hook devices 86', 88' in the form of hook jaws which are mounted such that they can pivot and/or rotate relative to each other about a gripping device rotation axis 90' of the gripping device 84'. The hook devices 86', 88' are shown in figure with the gripping device 84' in a released state. Preferably, the two hook devices 86', 88' are movable synchronously. However, it is also conceivable for the hook devices 86', 88' to be movable independently of each other in an alternative design of the gripping device 84'. The gripping device 84' comprises at least one guide element 94' in the form of a guide bolt, on or around which the hook devices 86', 88' are guided, and at least one mounting element 96' in the form of a mounting bolt, which is provided to support the hook devices 86', 88' such that they can pivot and/or rotate about the gripping device rotation axis 90' of the mounting element 96'. The gripping device 84' has at least two guide recesses 98', 100' in the form of guide grooves, which each form a guide path for guiding the hook devices 86', 88'. In each case one of the guide recesses 98', 100' is arranged on a single one of the hook devices 86', 88'. The guide element 94' engages in both guide recesses 98', 100' and is provided to move the hook devices 86', 88'. The two hook devices 86', 88' are preferably designed to be symmetrical to each other. The guide recesses 98', 100' are preferably designed to be symmetrical to each other. Preferably, the movement of the two hook devices 86', 88' is substantially synchronous, so that the two hook devices 86', 88' are movable together either into a fastening position or into a releasing position.

When the gripping device 84' is in a released state, the hook devices 86', 88' protrude relative to the driver device 82' in an axial direction to an output axis 92' of the output unit 16'. When the gripping device 84' is in the released state, the insert tool 72' can be removed from the quick-release clamping device 76' and/or from the output unit 16'. The output unit 16' can be driven in particular in a rotary manner about the output axis 92'. The hook devices 86', 88' protrude further relative to the driver device 82' in an axial direction of the output axis 92' when the gripping device 84' is in a released state than when the gripping device 84' is in a fastened state. When the gripping device 84' is in the fastened state, the insert tool 72' is fixed axially and/or for conjoint rotation on the quick-release clamping device 76' and/or on the output unit 16', in particular by means of the gripping device 84' and/or the driver device 82'.

When the gripping device 84' is in a released state, in which the hook devices 86', 88' are arranged in the releasing position, the hook devices 86', 88' protrude relative to the driver device 82' in an axial direction of the output axis 92'. The hook devices 86', 88' protrude further relative to the driver device 82' in an axial direction of the output axis 92' when the gripping device 84' is in a released state than in a fastened state in which the hook devices 86', 88' are arranged in the fastening position. The guide element 94' extends at least substantially perpendicular to the output axis 92'. The guide element 94' preferably forms the gripping device rotation axis 90'. The hook devices 86', 88' are mounted such that they can pivot about the gripping device rotation axis 90'.

Insert tools 72' of different dimensions, in particular different material thicknesses, can be fixed by means of the gripping device 84' using the hook devices 86', 88' depending on a pivot angle, angled relative to the output axis 92', of a gripping face 102', 104' of the gripping device 84'. The hook devices 86', 88' each have at least one radial gripping recess 106', 108' which is provided to grip the insert tool 72', in particular a securing unit 20' of a grinding means device 10' of the insert tool 72', at least in an axial direction of the output axis 92' in a fastened state and to release it in a released state. The gripping recesses 106', 108' each have at least one gripping face 102', 104' for transmitting an at least axial force action to the insert tool 72', in particular the securing unit 20' of the grinding means device 10' of the insert tool 72'. Each gripping recess 106', 108' is in the form of a gripping depression extending in a radial direction of the output axis 92'. In the fastened state, each gripping face 102', 104' extends transversely, in particular at least substantially perpendicular to the output axis 92'. Each gripping face 102', 104' is oriented toward the portable machine tool 14 in an axial direction of the output axis A. Each gripping face 102', 104' is designed to be even. The gripping face 102', 104' can be designed to be curved at least in some sections. Preferably, the gripping face 102', 104' makes contact with the insert tool 72', in particular the securing unit 20' of the grinding means device 10' of the insert tool 72', at least in some sections in the form of a point contact, preferably in the form of a linear contact, and particularly preferably in the form of an area contact. The form of the contact can change here in particular depending on a material thickness of the securing unit 20', in particular of an axial securing element 22', 24' of the securing unit 20'.

The hook devices 86', 88' of the gripping device 84' each have at least one peripheral face 110', 112' which delimits a maximum radial extent of the hook devices 86', 88'. The peripheral faces 110', 112' of the hook devices 86', 88' are oriented away from each other. The hook devices 86', 88' each have a first peripheral face 110a', 112a' and a second peripheral face 110b', 112b', which are separated in an axial direction by the gripping recess 106', 108'. The first and second peripheral faces 110a', 112a', 110b', 112b' delimit a radial extent of the gripping recess 106', 108'. The first peripheral face 110a', 112a' is configured to be curved at least around the output axis 92'.

Figure 3:
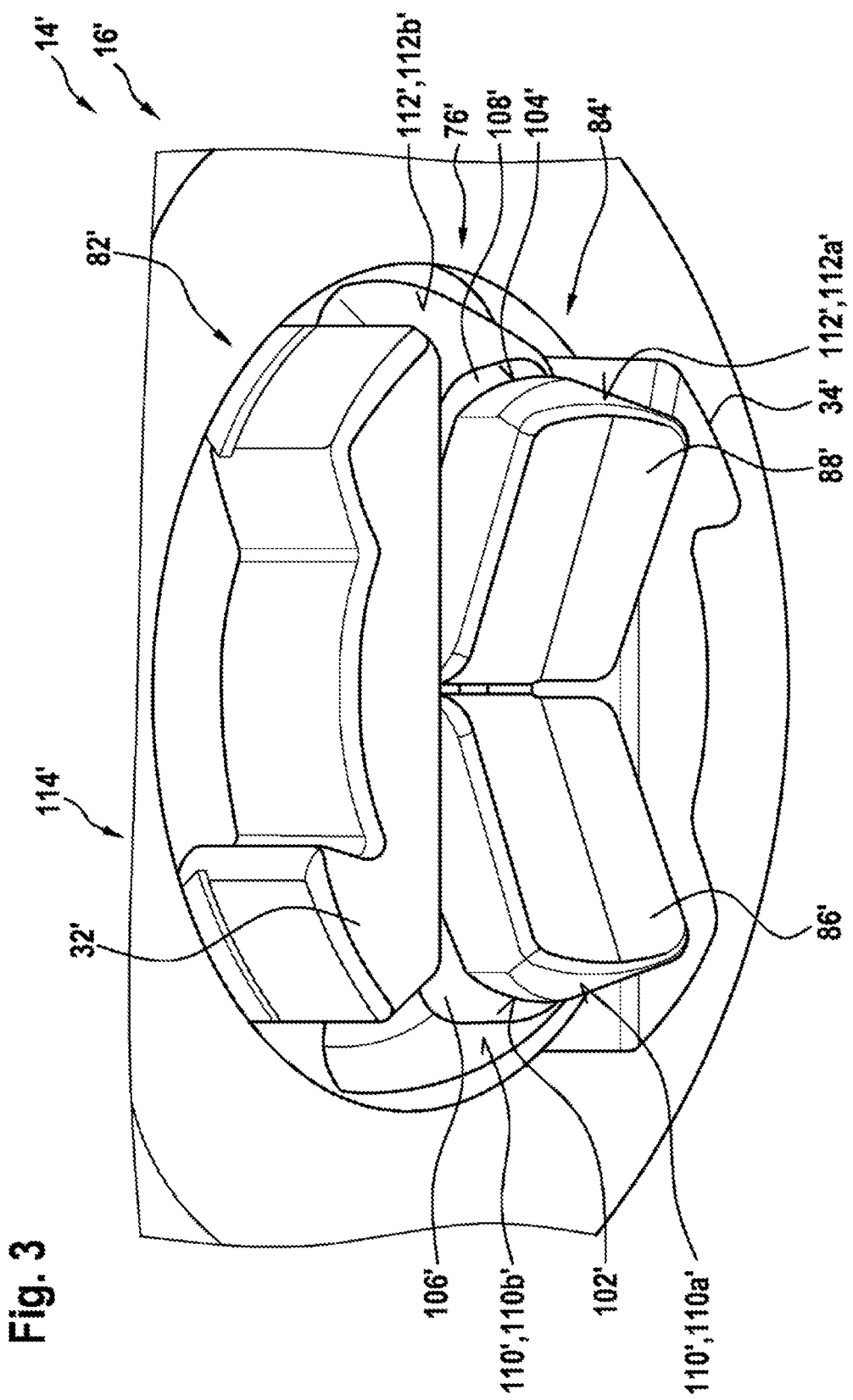
FIG. 3 shows a schematic diagram of a detail of a gripping device and a driver device of the quick-release clamping device of the portable machine tool.

FIG. 3 shows a detail of the driver device 82' and the gripping device 84'. The driver device 82' comprises at least one torque-transmitting region 114' for transmitting a drive force to the insert tool 72', in particular to the securing unit 20' and/or a receiving unit 18' of the grinding means device 10'. The torque-transmitting region 114' comprises at least two torque-transmitting projections 32', 34'. Each of the torque-transmitting projections 32', 34' has at least one straight output edge and/or an even output face. The output edge and/or the output face extend at least substantially parallel to a radial direction relative to the output axis 92'. The output edge and/or the output face are angled counter to a rotation direction of the output unit 16'. The torque-transmitting projections 32', 34' are arranged evenly on the driver device 82' according to an n-fold symmetry.

The driver device 82' can be in the form of a protective device. The driver device 82' preferably has a maximum radial extent which is greater than a maximum radial extent of the gripping device 84' in a fastened state, as a result of which the torque-transmitting projections 32', 34' which protrude in a radial direction of the output axis 92' during rotary driving of the quick-release clamping device 76' ensure protection of the hook devices 86', 88', in that the hook devices 86', 88' are protected by the torque-transmitting projections 32', 34' if the hook devices 86', 88' inadvertently come into contact with a workpiece during operation of the portable machine tool 14'. In particular, the hook devices 86', 88' can protrude relative to the torque-transmitting projections 32', 34' in an axial direction of the output axis 92' in a direction oriented away from the gripping device 84' when the gripping device 84' is in a released state.

Figure 4A:
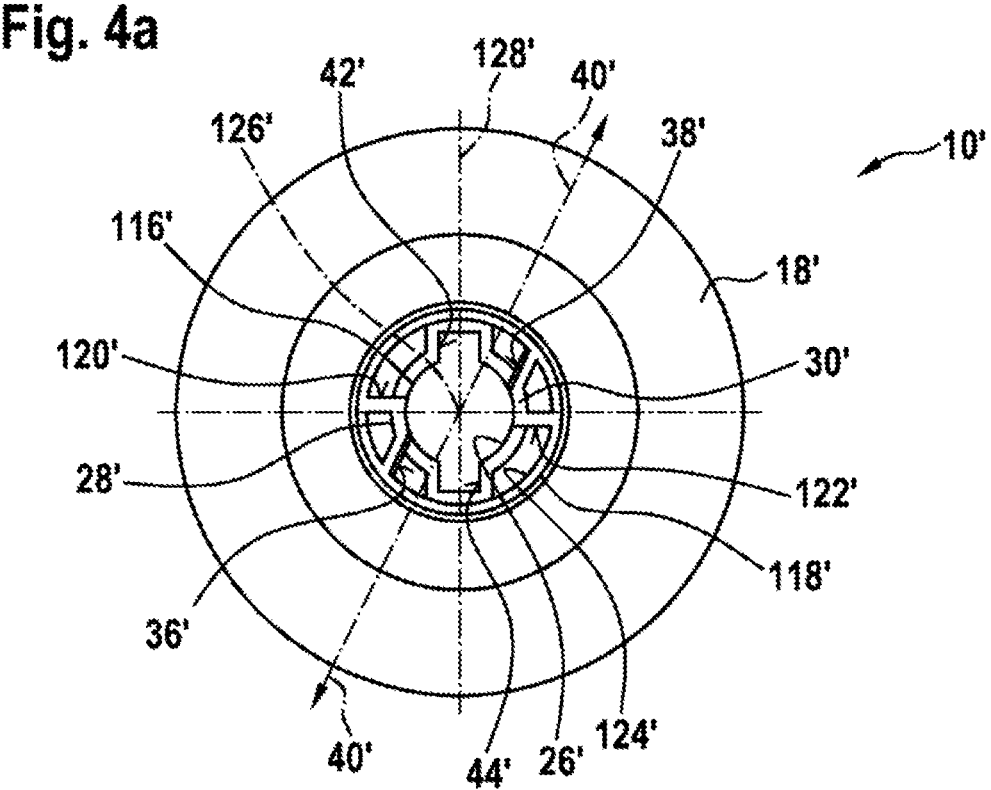
FIG. 4a shows a schematic diagram of a view from above of a receiving unit of a grinding means device according to the disclosure of the insert tool according to the disclosure.

FIG. 4a shows a view from above of the receiving unit 18' of the grinding means device 10' of the insert tool 72'. The insert tool 72' comprises at least the grinding means device 10' and at least one grinding means 12' which can be arranged on the grinding means device 10'. The grinding means 12' is preferably in the form of a grinding wheel, in particular a fiber wheel. A design of the grinding means 12' is explained in more detail later in the description of FIG. 7.

The grinding means device 10' is preferably in the form of a grinding means holding device. Particularly preferably, the grinding means device 10' is in the form of a grinding-disk device or backup-pad device. The grinding means device 10' is provided to arrange the at least one grinding means 12', in particular the at least one grinding wheel, on the portable machine tool 14', in particular on the quick-release clamping device 76'. The grinding means device 10' comprises at least the receiving unit 18' which is fixable in particular in a thread-free manner on the output unit 16' of the portable machine tool 14' and on which the at least one grinding means 12' can be arranged. The receiving unit 18' preferably in the form of a grinding disk or backup pad. The grinding means device 10' also comprises the at least one securing unit 20', in particular formed separately from the receiving unit 18', at least to axially fix the receiving unit 18' and/or the grinding means on the output unit 16' of the portable machine tool 14'. The securing unit 20' is provided at least to axially fix the receiving unit 18' and/or the grinding means 12' on the output unit 16' of the portable machine tool 14' in a tool-free manner, and/or at least to axially fix the grinding means 12' on the receiving unit 18' in a tool-free manner (cf. FIG. 6).

The receiving unit 18' has at least one torque-transmitting element 28', 30' in the vicinity of a receiving recess 26' of the receiving unit 18', in which the securing unit 20' at least partially engages, said torque-transmitting element being provided to interact with one of the torque-transmitting projections 32', 34' of the portable machine tool 14', in particular the driver device 82', at least when the receiving unit 18' is arranged on the output unit 16' of the portable machine tool 14', in particular on the quick-release clamping device 76'. The receiving unit 18' comprises the at least one torque-transmitting element 28', 30', which has at least one bearing face 36', 38' which runs at least substantially parallel to a radial direction 40' of the receiving unit 18'. In particular, the receiving unit 18' has at least two torque-transmitting elements 28', 30', which are preferably designed at least substantially analogously. Preferably, the torque-transmitting elements 28', 30' are arranged symmetrically, in particular according to an n-fold symmetry, on the receiving unit 18'. When the receiving unit 18' is arranged on the output unit 16', the torque-transmitting elements 28', 30' are preferably arranged on a side of the receiving unit 18' facing away from the portable machine tool 14', in particular at least partially in the receiving recess 26' of the receiving unit 18'. It is conceivable, in particular viewed when the receiving unit 18' is arranged on the output unit 16' on the portable machine tool 14', for a securing element of the receiving unit 18' to be arranged on a side of the torque-transmitting elements 28', 30' facing the output unit 16', said securing element being provided to prevent an inadvertent release of the receiving unit 18' from the output unit 16', in particular to prevent the receiving unit 18' falling off due to gravity after a fixing on the output unit 16' has been undone. The securing element of the receiving unit 18' can be in the form of a force-fitting element and/or a form-fitting element, such as, for example, a rubber element, in particular O-ring, which can be placed on the driver device 82', a spring-elastic snap element, a securing clip or the like, which is provided in particular in addition to the securing unit 20' to apply a holding force to hold the receiving unit 18' on the output unit 16'.

The torque-transmitting elements 28', 30' are preferably delimited by an inner limiting circle 116' and an outer limiting circle 118' of a driver recess 124' in which the driver device 82' at least partially engages, and by a bearing face 36', 38' and a rear face 120', 122' of the torque-transmitting elements 28', 30'. When the receiving unit 18' is arranged on the output unit 16', the driver device 82' preferably engages at least partially in the driver recess 124' and/or bears against an edge region of the receiving unit 18' which delimits the driver recess 124'. The inner limiting circle 116' preferably has a maximum diameter of less than 30 mm, in particular a maximum diameter of 23 mm. The inner limiting circle 116' is preferably provided to allow the securing unit 20' to be inserted at least partially into the receiving unit 18'. The inner limiting circle 116' delimits the receiving recess 26' in a direction running at least substantially perpendicular to a rotation axis 126' of the receiving unit 18', in particular in a direction facing away from the rotation axis 126'. The outer limiting circle 118' preferably has a maximum diameter of less than 50 mm, in particular a maximum diameter having a value within a value range of 28 mm to 42 mm, preferably a maximum diameter of 39 mm. The outer limiting circle 118' delimits the driver recess 124' in a direction running at least substantially perpendicular to the rotation axis 126' of the receiving unit 18', in particular in a direction facing away from the rotation axis 126'. The inner limiting circle 116' is preferably provided to allow a protective function which at least largely prevents inadvertent operation of the gripping device 84' by the receiving unit 18', in particular since the inner limiting circle 116' has a greater dimension than a maximum radial extent of the gripping device 84'.

The bearing faces 36', 38' of the torque-transmitting elements 28', 30' preferably extend between the inner limiting circle 116' and the outer limiting circle 118'. Preferably, the bearing faces 36', 38' of the torque-transmitting elements 28', 30' run transversely to a tangential direction of the inner limiting circle 116' and the outer limiting circle 118'. Preferably, the bearing faces 36', 38' of the torque-transmitting elements 28', 30' are each arranged offset relative to the radial direction 40' of the receiving unit 18', in particular running through the rotation axis 126' of the receiving unit 18'. Preferably, the bearing faces 36', 38' of the torque-transmitting elements 28', 30' have a maximum distance, in particular running perpendicular to the bearing face 36', 38', from the radial direction 40' of the receiving unit 18', in particular running through the rotation axis 126 of the receiving unit 18', which is in particular less than 10 mm, preferably less than 8 mm, particularly preferably less than 7 mm, and very particularly preferably greater than 5 mm. Preferably, the bearing faces 36', 38' of the torque-transmitting elements 28', 30' are each arranged angled in relation to a center axis 128', in particular an axis of symmetry of the receiving recess 26', by an angle of less than 45°, in particular of 25°.

The rear faces 120', 122' of the torque-transmitting elements 28', 30' preferably extend between the inner limiting circle 116' and the outer limiting circle 118'. Preferably, the rear faces 120', 122' of the torque-transmitting elements 28', 30' run transversely, in particular at least substantially perpendicular to the tangential direction of the inner limiting circle 116' and the outer limiting circle 118'. Preferably, the rear faces 120', 122' of the torque-transmitting elements 28', 30' are each arranged offset relative to the radial direction 40' of the receiving unit 18', in particular running through the rotation axis 126' of the receiving unit 18'. Preferably, the rear faces 120', 122' of the torque-transmitting elements 28', 30' have a maximum distance, in particular running perpendicular to the rear faces 120', 122', from the radial direction 40' of the receiving unit 18', in particular running through the rotation axis 126' of the receiving unit 18', which is in particular less than 8 mm, preferably less than 6 mm, particularly preferably less than 5 mm, and very particularly preferably greater than 4 mm. Preferably, the rear faces 120', 122' of the torque-transmitting elements 28', 30' are each arranged angled in relation to a center axis 128', in particular the axis of symmetry of the receiving recess 26', by an angle of more than 45°, in particular of 90°.

Figure 4B:
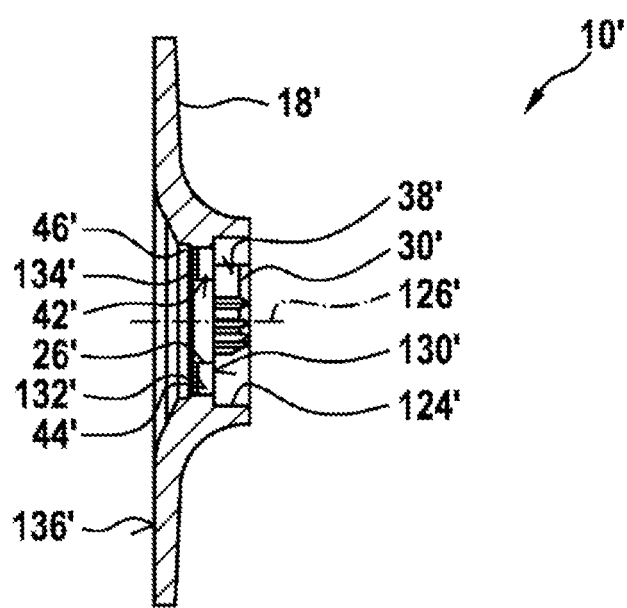
FIG. 4b shows a schematic diagram of a sectional view through the receiving unit of the grinding means device according to the disclosure.

The driver recess 124' extends from an outer face of the receiving unit 18', said face facing the portable machine tool 14' and in particular running at least substantially perpendicular to the rotation axis 126' of the receiving unit 18', in a direction running at least substantially parallel to the rotation axis 126' of the receiving unit 18' at most as far as a connecting face 130' of the receiving unit 18', against which the driver device 82' at least partially bears when the receiving unit 18' is arranged on the output unit 16'. A maximum distance, in particular in the direction running at least substantially parallel to the rotation axis 126' of the receiving unit 18', between the connecting face 130' of the receiving unit 18' and the outer face of the receiving unit 18' is in particular less than 10 mm, preferably less than 8 mm, particularly preferably less than 7 mm, and very particularly preferably greater than 5 mm (cf. FIG. 4b).

The receiving unit 18' has at least the receiving recess 26' in which the securing unit 20' at least partially engages, wherein at least one edge region of the receiving unit 18', said edge region at least partially delimiting the receiving recess 26', forms at least one contact face 42', 44' for transmitting a drive force and/or a drive torque to the securing unit 20'. Preferably, the edge region of the receiving unit 18', said edge region at least partially delimiting the receiving recess 26', forms at least two contact faces 42', 44'. The contact faces 42', 44' are each preferably arranged offset relative to the bearing faces 36', 38' of the torque-transmitting elements 28', 30', in particular in a direction running at least substantially parallel to the rotation axis 126' of the receiving unit 18'. The contact faces 42', 44' each preferably run transversely to the bearing faces 36', 38' of the torque-transmitting element 28', 30'. In particular, the contact faces 42', 44' and the bearing faces 36', 38' are arranged inclined relative to each other, in particular by an angle of less than 40°, preferably less than 30°, and particularly preferably less than 26°. Preferably, the contact faces 42', 44' run at least substantially parallel to the radial direction 40' of the receiving unit 18', in particular running through the rotation axis 126' of the receiving unit 18', preferably to the center axis 128' of the receiving recess 26'. Preferably, the contact faces 42', 44' have a maximum distance, in particular running perpendicular to the contact faces 42', 44', from the radial direction 40' of the receiving unit 18', in particular running through the rotation axis 126' of the receiving unit 18', preferably the center axis 128' of the receiving recess 26', which is in particular less than 8 mm, preferably less than 6 mm, particularly preferably less than 5 mm, and very particularly preferably greater than 4 mm. An edge face which delimits the receiving recess 26', runs at least substantially perpendicular to at least one of the contact faces 42', 44' and in particular runs directly adjacent to the at least one of the contact faces 42', 44' preferably has a maximum distance, in particular a maximum distance running perpendicular to the edge face, from the rotation axis 126' of the receiving unit 18' which is in particular less than 25 mm, preferably less than 22 mm, particularly preferably less than 18 mm and very particularly preferably greater than 16 mm. The edge face which delimits the receiving recess 26', runs at least substantially perpendicular to at least one of the contact faces 42', 44' and in particular runs directly adjacent to the at least one of the contact faces 42', 44' is preferably provided as a radial stop of the securing unit 20', in particular of the axial securing elements 22', 24' of the securing unit 20'.

Figure 4C:
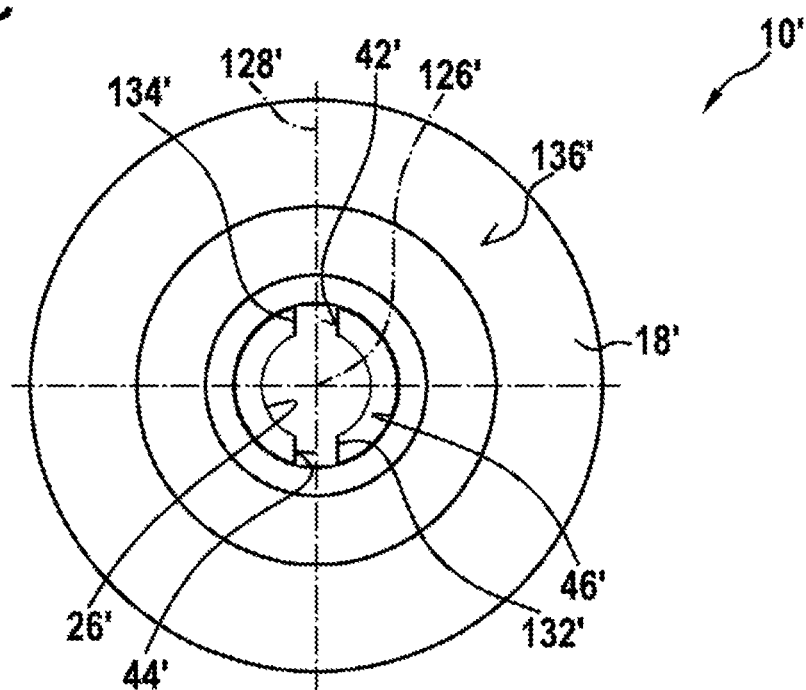
FIG. 4c shows a schematic diagram of a further view from above of the receiving unit of the grinding means device according to the disclosure of the insert tool according to the disclosure.

In a transition region between the contact faces 42', 44' and the connecting face 130', the receiving unit 18' in each case comprises at least one insertion ramp 132', 134' (cf. FIG. 4c). The insertion ramps 132', 134' are preferably angled toward the connecting face 130' of the receiving unit 18' and/or toward the contact faces 42', 44'. Preferably, the insertion ramps 132', 134' and the connecting face 130' of the receiving unit 18' form an angle which corresponds to a value within a value range of 30° to 60°, in particular a value of 45°. Alternatively or additionally, it is conceivable for the receiving unit 18' to have in particular further insertion ramps in a transition region between the torque-transmitting elements 28', 30' and the connecting face 130', said insertion ramps being angled relative to the connecting face 130', in particular forming an angle with the connecting face 130' corresponding to a value within a value range of 30° to 60°, in particular a value of 45°, and being provided for convenient arrangement of the receiving unit 18' on the driver device 82'. The torque-transmitting elements 28', 30', the bearing faces 36', 38', the contact faces 42', 44', the rear faces 120', 122', the receiving recess 26', the driver recess 124', the connecting face 130' and the insertion ramps 132', 136' are preferably arranged on a main body of the receiving unit 18', in particular formed integrally with the main body, preferably by means of an injection-molding method.

The receiving unit 18' has at least one positioning recess 46' for positioning the securing unit 20', wherein the positioning recess 46' is arranged adjacent to the receiving recess 26' of the receiving unit 18' which is at least partially delimited by at least one edge region of the receiving unit 18', said edge region being provided for transmitting a drive force and/or a drive torque to the securing unit 20'. Preferably, the positioning recess 46' is arranged on a side of the receiving unit 18' facing away from the receiving recess 26'. The positioning recess 46' preferably has a maximum depth, in particular viewed in a direction running at least substantially parallel to the rotation axis 126' of the receiving unit 18', which is in particular less than 8 mm, preferably less than 6 mm, particularly preferably less than 3 mm and very particularly preferably greater than 1 mm. The positioning recess 46' preferably has a maximum transverse extent, in particular a maximum diameter, in a direction running at least substantially perpendicular to the rotation axis 126' of the receiving unit 18', which is in particular less than 50 mm, preferably less than 40 mm, particularly preferably less than 36 mm, and very particularly preferably greater than 35 mm.

The receiving unit 18' comprises at least one grinding means bearing face 136' which is arranged on a side of the receiving unit 18' facing away from the driver recess 124'. The grinding means bearing face 136' is provided for supporting the grinding means 12'. The receiving unit 18' has a sloping face in a transition region between the grinding means bearing face 136' and the positioning recess 46'. The sloping face and a plane running at least substantially parallel to the rotation axis 126' of the receiving unit 18' form an angle which corresponds to a value within a value range of 14° to 32°, in particular a value of 25°. The sloping face preferably forms a stop face for the securing unit 20', in particular for a face arranged on form-fitting elements 48', 50' of the securing unit 20'.

Figure 5:
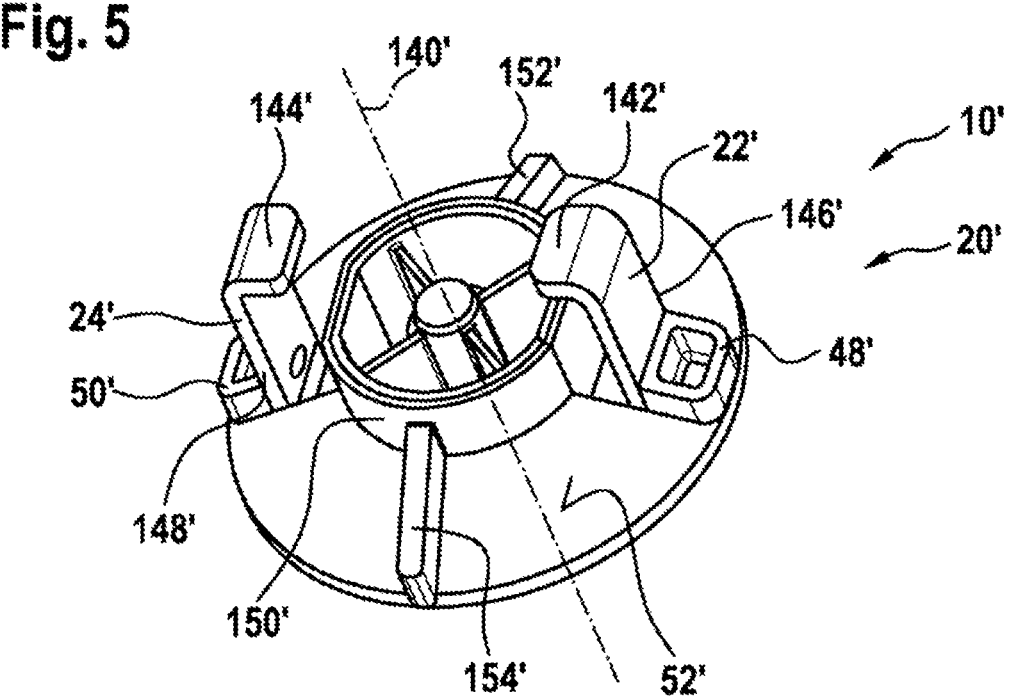
FIG. 5 shows a schematic diagram of an enlarged view of a securing unit of the grinding means device according to the disclosure of the insert tool according to the disclosure.
Figure 6:
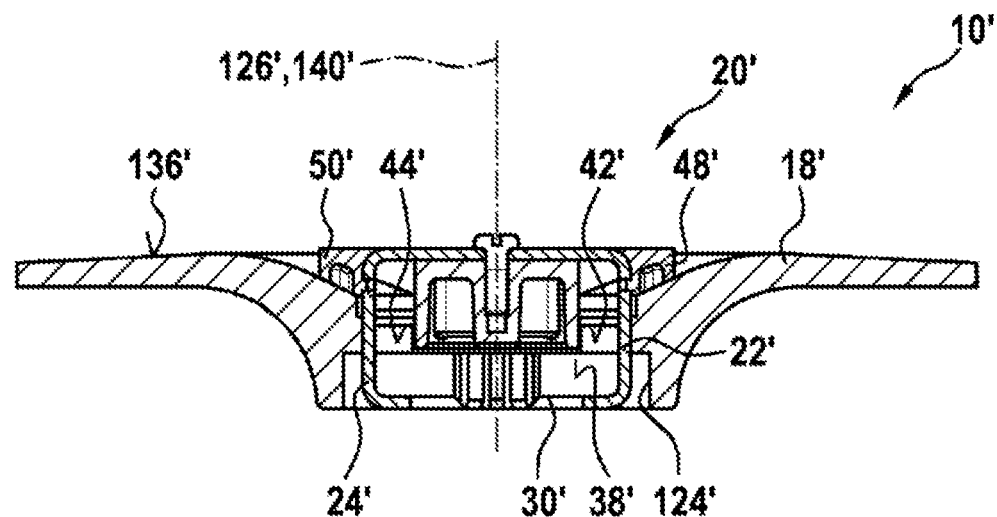
FIG. 6 shows a schematic diagram of a sectional view through the receiving unit and the securing unit when the receiving unit and the securing unit are assembled to one another.

The securing unit 20' comprises at least the axial securing element 22', 24' which engages at least partially in the receiving unit 18', in particular in the receiving recess 26' of the receiving unit 18', to axially fix the receiving unit 18' and/or the grinding means 12' in a tool-free manner (cf. FIGS. 5 and 6). The securing unit 20' comprises the at least one axial securing element 22', 24', which is configured to be deflectable in a spring-elastic manner (cf. FIG. 5). Preferably, the securing unit 20' comprises at least two axial securing elements 22', 24', which are in particular designed at least substantially analogously to each other. The axial securing elements 22', 24' are preferably provided to engage in the gripping recesses 106', 108', in particular when the securing unit 20' is arranged on the output unit 16'. The axial securing elements 22', 24' are preferably in the form of snap elements, in particular snap hooks. Snap regions 142', 144' preferably extend transversely, in particular at least substantially perpendicular, to a center axis 140', in particular to a rotation axis, of the securing unit 20'. Projection regions 146', 148' of the axial securing elements 22', 24', which are arranged in particular directly adjacent to the snap regions 142', 144', extend in a direction running at least substantially parallel to the center axis 140', in particular to the rotation axis, of the securing unit 20'. The axial securing elements 22', 24' can be formed integrally with a main body of the securing unit 20' or be formed separately from the main body of the securing unit 20' and in particular be fixed on the main body of the securing unit by means of a connection, in particular a form-fitting and/or force-fitting connection, which seems practical to a person skilled in the art. The axial securing elements 22', 24', in particular the snap regions 142', 144', preferably have a minimum distance from the center axis 140', in particular from the rotation axis, of the securing unit 20', which is in particular less than 22 mm, preferably less than 15 mm, particularly preferably less than 12 mm, and very particularly preferably greater than 10 mm. Preferably, the axial securing elements 22', 24', in particular the snap regions 142', 144', each have a maximum width, in particular one viewed in a plane running at least substantially perpendicular to the center axis 140', in particular to the rotation axis, of the securing unit 20', of in particular less than 15 mm, preferably less than 12 mm, particularly preferably less than 10 mm, and very particularly preferably more than 1.9 mm. Preferably, the axial securing elements 22', 24', in particular the snap regions 142', 144', have a maximum material thickness, which is in particular less than 4 mm, preferably less than 3 mm, particularly preferably less than 2 mm, and very particularly preferably greater than 0.5 mm. The snap regions 142', 144' preferably have a maximum distance from a face of the securing unit 20', which faces away from the receiving unit 18' when arranged on the receiving unit 18' and runs at least substantially perpendicular to the center axis 140', in particular to the rotation axis, of the securing unit 20', which is in particular less than 30 mm, preferably less than 25 mm, particularly preferably less than 22 mm, and very particularly preferably greater than 14 mm. The face arranged on the form-fitting elements 48', 50' of the securing unit 20' and a plane running at least substantially perpendicular to the center axis 140', in particular to the rotation axis, of the securing unit 20' preferably form an angle which is in particular less than 35°, preferably less than 30°, particularly preferably less than 25°, and very particularly preferably greater than 14°.

The securing unit 20' comprises at least one insertion projection 150', which is provided to be inserted at least partially into the receiving recess 26' and/or to engage at least partially in the receiving recess 26'. The insertion projection 150' is formed integrally with the main body of the securing unit 20', in particular arranged adjacent to a clamping face 52' of the securing unit 20'. The insertion projection 150' extends preferably transversely, in particular at least substantially perpendicular to the clamping face 52'.

The securing unit 20' has at least the form-fitting element 48', 50' for transmitting a drive force and/or a drive torque to the grinding means 12' (cf. FIG. 5). The form-fitting element 48', 50' is arranged on the clamping face 52' of the securing unit 20' which can be placed against the grinding means 12' to axially fix the grinding means 12' on the receiving unit 18' and/or on the output unit 16'. The form-fitting element 48', 50' preferably extends beyond the clamping face 52' in a direction running at least substantially parallel to the center axis 140', in particular to the rotation axis, of the securing unit 20'. Preferably, the securing unit 20' comprises at least two form-fitting elements 48', 50'. Preferably, the at least two form-fitting elements 48', 50' are arranged symmetrically, in particular according to an n-fold symmetry, on the main body of the securing unit 20'. Preferably, the securing unit 20' comprises at least one further form-fitting element 152', 154', which is provided for engagement in the grinding means 12'. In particular, the securing unit 20' comprises at least two further form-fitting elements 152', 154'. Preferably, the at least two further form-fitting elements 152', 154' are arranged symmetrically, in particular according to an n-fold symmetry, on the main body of the securing unit 20'. The further form-fitting elements 152', 154' preferably extend at least substantially perpendicular to the form-fitting elements 48', 50'. The further form-fitting elements 152', 154' preferably have a smaller maximum width extension than the form-fitting elements 48', 50' (cf. FIG. 5). The form-fitting elements 48', 50' have a maximum width extension which is in particular less than 15 mm, preferably less than 12 mm, particularly preferably less than 10 mm, and very particularly preferably greater than 3 mm. The further form-fitting elements 152', 154' have a maximum width extension which is in particular less than 8 mm, preferably less than 5 mm, particularly preferably less than 3 mm, and very particularly preferably greater than 2 mm.

Figure 7:
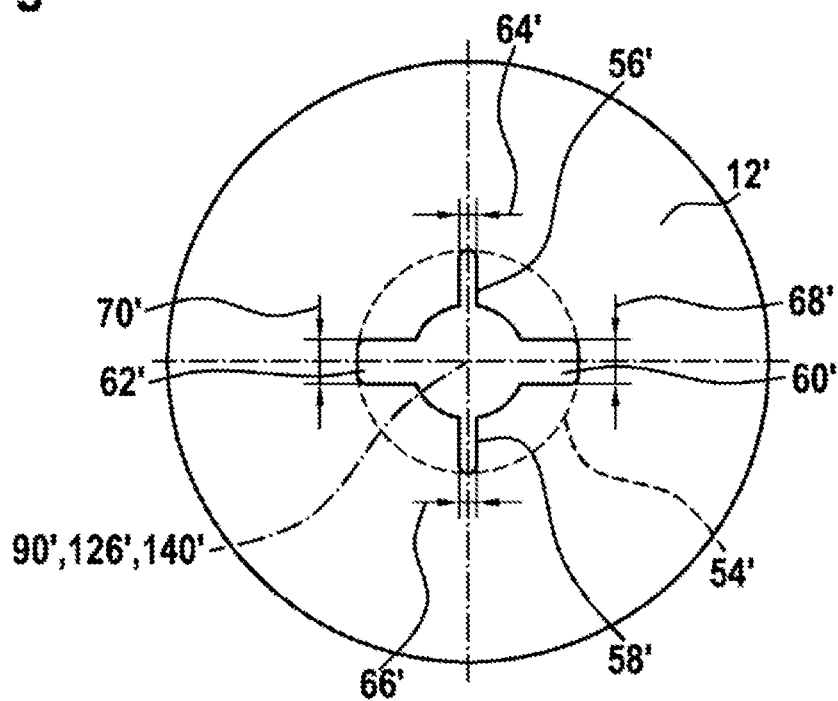
FIG. 7 shows a schematic diagram of a detail of a grinding means, in particular a fiber wheel, of the insert tool according to the disclosure.

FIG. 7 shows a detail of the grinding means 12' of the insert tool 72', said grinding means being fixable, in particular axially and/or in the circumferential direction, on the output unit 16' by means of the grinding means device 10' of the insert tool 72'. The grinding means 12', in particular a grinding wheel, is preferably fixable on the portable machine tool 14' by means of the grinding means device 10'.

The grinding means 12' comprises at least one coupling unit 54' for connecting, in particular in a form-fitting and/or force-fitting manner, to the securing unit 20' of the grinding means device 10', wherein the coupling unit 54' has at least two differently designed connecting elements 56', 58', 60', 62', in particular connecting recesses. The form-fitting elements 48', 50' and the further form-fitting elements 152', 154' are preferably provided to engage in the connecting elements 56', 58', 60', 62'. The at least two differently designed connecting elements 56', 58', 60', 62' have at least different maximum width extensions 64', 66', 68', 70'. At least two of the connecting elements 56', 58', 60', 62' are formed correspondingly to the form-fitting elements 48', 50'. At least two of the connecting elements 56', 58', 60', 62' are formed correspondingly to the further form-fitting elements 152', 154'. At least two of the connecting elements 56', 58', 60', 62' are arranged in each case according to an n-fold symmetry on the grinding means 12'.

The receiving unit 18' can be arranged on the quick-release clamping device 76' to fix the grinding means 12'. The grinding means 12' can be arranged on the receiving unit 18'. The securing unit 20' can be arranged on the receiving unit 18' and/or on the quick-release clamping device 76'. As a result of an interaction of the axial securing elements 22', 24', the grinding means 12' and/or the receiving unit 18' can be fixed axially on the quick-release clamping device 76'. As a result of an engagement of the form-fitting elements 48', 50' and/or of the further form-fitting elements 152', 154' in the connecting element 56', 58', 60', 62', a transmission from the output unit 16' via the receiving unit 18' and via the securing unit 20' to the grinding means 12' can be realized by a form-fitting connection. The grinding means 12' can preferably be placed and/or pressed against the grinding means bearing face 136' of the receiving unit 18' by the clamping face 52' of the securing unit 20' by means of an interaction of the axial securing element 22', 24' and the gripping device 84'. A secure connection of the grinding means 12' on the output unit 16' can advantageously be realized by means of the grinding means device 10'.

Figure 8:
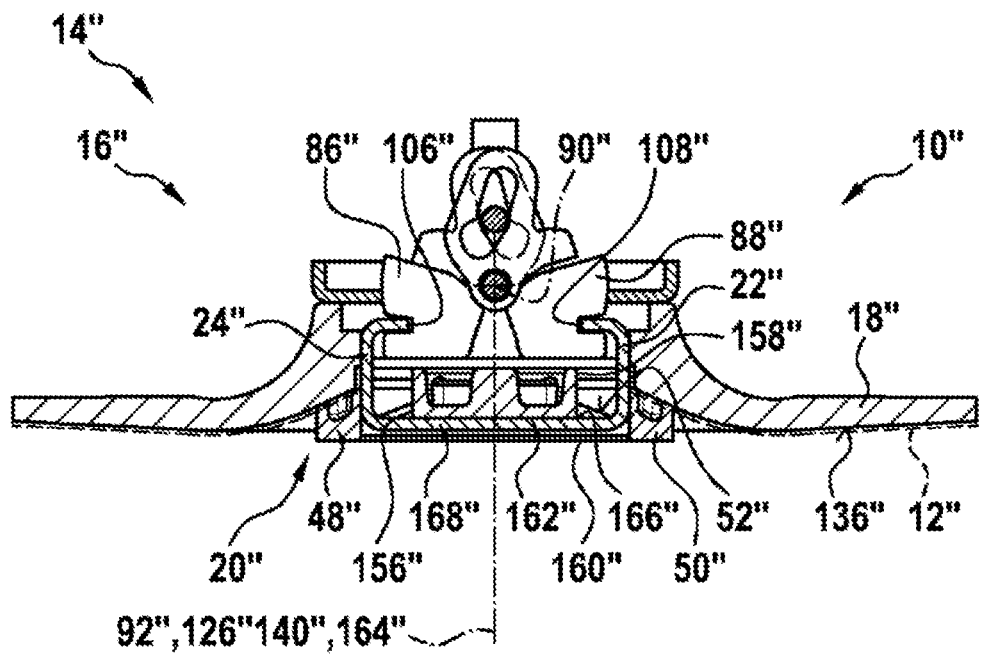
FIG. 8 shows a schematic diagram of a sectional view through an alternative grinding means device according to the disclosure when arranged on a quick-release clamping device of a portable machine tool.
Figure 9:
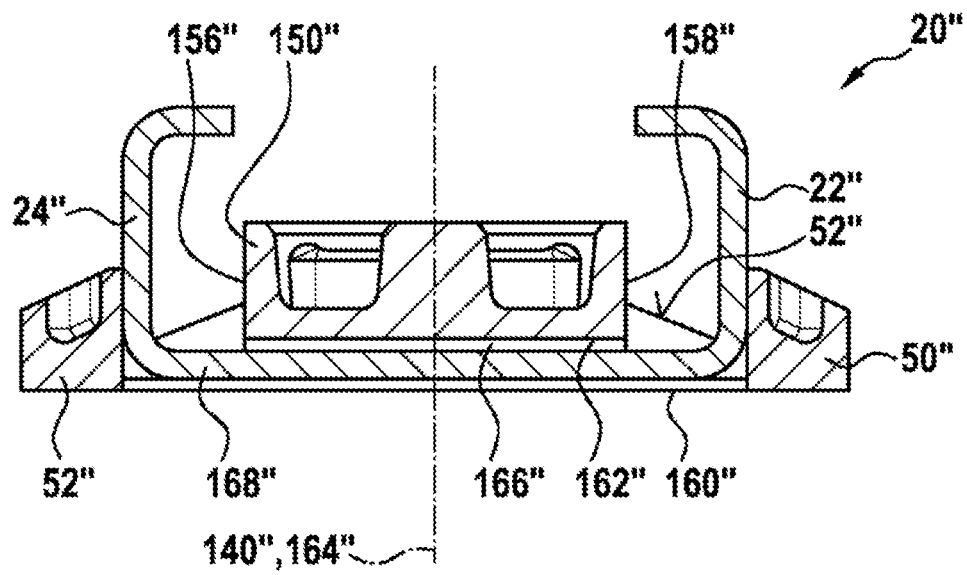
FIG. 9 shows a schematic diagram of a sectional view through a securing unit of the alternative grinding means device according to the disclosure from FIG. 8.

In FIGS. 8 and 9, a further exemplary embodiment of the disclosure is shown. The following descriptions and the drawings are limited substantially to the differences between the exemplary embodiments; reference can in principle also be made to the drawings and/or the description of the other exemplary embodiments, in particular to FIGS. 1 to 7, for components referred to in the same way, in particular for components with the same reference signs. To differentiate the exemplary embodiments, an apostrophe is added to the reference signs of the exemplary embodiment in FIGS. 1 to 7. Two apostrophes are added to the reference signs in the exemplary embodiment of FIGS. 8 and 9.

FIG. 8 shows a sectional view through an alternative grinding means device 10" when arranged on a quick-release clamping device 76" (only part of which is shown in FIG. 8) of a portable machine tool 14", wherein a grinding means 12" (indicated only with dashed lines in FIG. 8) is firmly clamped on an output unit 16" of the portable machine tool 14" by means of an interaction of the quick-release clamping device 76" of the grinding means device 10". With regard to a design of the portable machine tool 14", in particular of the quick-release clamping device 76" of the portable machine tool 14", reference may be made to the description of FIGS. 1 to 7, which can be read analogously onto the portable machine tool 14" shown at least partially in FIG. 8, in particular the quick-release clamping device 76" of the portable machine tool 14" shown in FIG. 8.

The grinding means device 10" is preferably in the form of a grinding-disk device or backup-pad device. The grinding means device 10" is provided to arrange the grinding means 12", in particular a grinding wheel, on the portable machine tool 14", in particular a grinding machine. The grinding means device 10" comprises at least one receiving unit 18", in particular grinding disk or backup pad, which is fixable in particular in a thread-free manner on the output unit 16" of the portable machine tool 14" and on which at least the grinding means 12" can be arranged, and at least one securing unit 20", formed in particular separately from the receiving unit 18", at least for axially fixing the receiving unit 18" and/or the grinding means 12" on the output unit 16" of the portable machine tool 14". The securing unit 20" is provided at least to axially fix the receiving unit 18" and/or the grinding means 12" on the output unit 16" of the portable machine tool 14" in a tool-free manner, and/or at least to axially fix the grinding means 12" on the receiving unit 18" in a tool-free manner. The securing unit 20" comprises at least one axial securing element 22", 24" which engages at least partially in the receiving unit 18", in particular in a receiving recess 26" of the receiving unit 18", to axially fix the receiving unit 18" and/or the grinding means 12" in a tool-free manner. The at least one axial securing element 22", 24" is configured to be spring-elastic. Preferably, the securing unit 20" comprises at least two axial securing elements 22", 24", which are in particular designed at least substantially analogously to each other. The axial securing elements 22", 24" are preferably formed integrally with each other. Preferably, the two axial securing elements 22", 24" form a c-shaped securing clip. The axial securing elements 22", 24" are preferably provided to engage in the gripping recesses 106", 108" of the quick-release clamping device 76", in particular when the securing unit 20" is arranged on the output unit 16". The axial securing elements 22", 24" are preferably in the form of snap elements, in particular snap hooks.

In contrast to the securing unit 20' described in the description of FIGS. 1 to 7, the securing unit 20" shown in FIGS. 8 and 9 has the at least one axial securing element 22", 24", in particular the at least two axial securing elements 22", 24", which is/are mounted movably on a main body of the securing unit 20". The at least two axial securing elements 22", 24" are preferably mounted such that they can move together relative to the main body of the securing unit 20", in particular as a result of the integral design of the at least two axial securing elements 22", 24". The at least one axial securing element 22", 24", in particular the at least two axial securing elements 22", 24", has/have at least one movement axis 164", along which the at least one axial securing element 22", 24", in particular the at least two axial securing elements 22", 24", is/are movably mounted. Preferably, the at least one axial securing element 22", 24", in particular the at least two axial securing elements 22", 24", is/are mounted on the main body of the securing unit 20" such that said axial securing element(s) can move translationally, in particular linearly, along the movement axis 164". The movement axis 164" of the at least one axial securing element 22", 24", in particular of the at least two axial securing elements 22", 24", preferably runs at least substantially parallel, in particular coaxially, to a center axis 140", in particular to a rotation axis, of the securing unit 20". However, it is also conceivable for the movement axis 164" of the at least one axial securing element 22", 24", in particular of the at least two axial securing elements 22", 24", to run in another direction which seems practical to a person skilled in the art and/or for the at least one axial securing element 22", 24", in particular the at least two axial securing elements 22", 24", alternatively or additionally to be movably mounted on the main body of the securing unit 20" such that said axial securing element(s) can pivot about the movement axis 164" relative to the main body of the securing unit 20".

The main body of the securing unit 20" at least has a movement-guiding element 156", 158", in particular a guide groove, which is provided to guide the at least one axial securing element 22", 24" during a movement relative to the main body of the securing unit 20". Preferably, the movement-guiding element 156", 158" is at least partially delimited by at least one form-fitting element 48", 50" of the securing unit 20", which is in particular arranged on the main body of the securing unit 20" and is provided to transmit a drive force and/or a drive torque to the grinding means 12". Preferably, the movement-guiding element 156", 158" is at least partially delimited by the at least one form-fitting element 48", 50" and at least one insertion projection 150" of the securing unit 20", which is in particular arranged on the main body of the securing unit 20".

The main body of the securing unit 20" has at least one movement-limiting element 160", 162", which is provided to limit a maximum movement distance of the at least one axial securing element 22", 24", in particular of the at least two axial securing elements 22", 24", relative to the main body of the securing unit 20". The movement-limiting element 160" is preferably in the form of a projection. However, it is also conceivable for the movement-limiting element 160" to be in the form of a baseplate of the main body of the securing unit 20", in particular in the form of a baseplate of the main body of the securing unit 20", facing away from a clamping face 52" of the main body of the securing unit 20". Preferably, the at least one movement-limiting element 160" is arranged on a mounting recess 166" of the main body of the securing unit 20", in particular on an edge region of the mounting recess 166". The at least one axial securing element 22", 24", in particular the at least two axial securing elements 22", 24", is/are arranged movably in the mounting recess 166", preferably when the at least one axial securing element 22", 24", in particular the at least two axial securing elements 22", 24", is/are arranged on the main body of the securing unit 20". Preferably, the movement-limiting element 160" extends at least partially into the mounting recess 166" transversely, in particular at least substantially perpendicular, to the center axis 140" of the main body of the securing unit 20". The movement-limiting element 160" is preferably provided to narrow an insertion opening of the mounting recess 166", in particular to prevent and/or impede the at least one axial securing element 22", 24", in particular the at least two axial securing elements 22", 24", inadvertently falling off or being taken out of the mounting recess 166". The movement-limiting element 160" is preferably integrally molded on the main body of the securing unit 20". However, it is also conceivable for the movement-limiting element 160" to be formed separately from the main body of the securing unit 20" and to be fixed on the main body of the securing unit 20" by means of a form-fitting and/or force-fitting connection which seems practical to a person skilled in the art. To arrange the at least one axial securing element 22", 24", in particular the at least two axial securing elements 22", 24", in the mounting recess 166", an elastic deformation of the movement-limiting element 160" and/or of the at least one axial securing element 22", 24", in particular of the at least two axial securing elements 22", 24", preferably takes place.

The main body of the securing unit 20" also has at least one further movement-limiting element 162", which is provided to limit a maximum movement distance of the at least one axial securing element 22", 24", in particular of the at least two axial securing elements 22", 24", relative to the main body of the securing unit 20". The further movement-limiting element 162" preferably limits the mounting recess 166" on a side of the mounting recess 166" facing away from the movement-limiting element 162". The further movement-limiting element 162" preferably forms a stop face, delimiting the mounting recess 166", for the at least one axial securing element 22", 24", in particular for the at least two axial securing elements 22", 24". Preferably, the further movement-limiting element 162" is arranged on the insertion projection 150" on a side facing away from the clamping face 52", in particular molded integrally thereon.

When the grinding means device 10" is arranged on the quick-release clamping device 76" and fastened by means of a gripping device 84" of the quick-release clamping device 76", the at least one axial securing element 22", 24", in particular the at least two axial securing elements 22", 24", bears against the further movement-limiting element 162" (cf. FIG. 8). When the grinding means device 10" is arranged on the quick-release clamping device 76" and fastened by means of a gripping device 84" of the quick-release clamping device 76", a central bridge 168", connecting the at least two axial securing elements 22", 24" integrally to each other, of the securing unit 20" preferably bears against the further movement-limiting element 162". When the quick-release clamping device 76" is in a released state and/or when the securing unit 20" is removed from the quick-release clamping device 76", the at least one axial securing element 22", 24", in particular the at least two axial securing elements 22", 24", bears against the movement-limiting element 160". When the quick-release clamping device 76" is in a released state and/or when the securing unit 20" is removed from the quick-release clamping device 76", the central bridge 168", connecting the at least two axial securing elements 22", 24" integrally to each other, of the securing unit 20" preferably bears against the movement-limiting element 160". However, it is also conceivable for the at least one axial securing element 22", 24", in particular the at least two axial securing elements 22", 24", to bear against the movement-limiting element 160" when the quick-release clamping device 76" is in a released state and/or when the securing unit 20" is removed from the quick-release clamping device 76", in particular depending on a spatial orientation of the securing unit 20" and a resulting effect of gravity on the at least one axial securing element 22", 24", in particular the at least two axial securing elements 22", 24". With regard to further features and functions of the grinding means device 10" shown in FIGS. 8 and 9, reference may be made to the description of FIGS. 1 to 7, which can be read analogously onto FIGS. 8 and 9.

The invention claimed is:

1. A grinding device for arranging at least one grinding apparatus on a portable machine tool, the grinding device comprising:
   at least one receiving unit configured to be fixed on an output unit of the portable machine tool and configured for the at least one grinding apparatus to be arranged on the at least one receiving unit; and
   at least one securing unit configured for axially fixing the at least one receiving unit and/or the at least one grinding apparatus on the output unit of the portable machine tool, wherein the at least one securing unit is configured to (i) axially fix the at least one receiving unit and/or the grinding apparatus on the output unit of the portable machine tool in a tool-free manner with the at least one receiving unit and/or the grinding apparatus clamped between the at least one securing unit and the output unit, and/or (ii) axially fix the grinding apparatus on the at least one receiving unit in a tool-free manner with the grinding apparatus clamped between the at least one securing unit and the at least one receiving unit,
   wherein the at least one securing unit is configured to couple to and de-couple from the at least one receiving unit in a tool-free manner, and
   wherein the at least one securing unit comprises at least one axial securing element, which is mounted movably on a main body of the at least one securing unit.

2. The grinding device as claimed in claim 1, wherein the at least one axial securing element engages at least partially in a receiving recess of the at least one receiving unit to axially fix the at least one receiving unit and/or the grinding apparatus in the tool-free manner.

3. The grinding device as claimed in claim 1, wherein the at least one axial securing element is configured to be deflected in a spring-elastic manner.

4. The grinding device as claimed in claim 1, wherein the main body of the at least one securing unit has at least one movement-guiding element, which includes a guide groove configured to guide the at least one axial securing element during a movement relative to the main body of the at least one securing unit.

5. The grinding device as claimed in claim 1, wherein the main body of the at least one securing unit has at least one movement-limiting element that limits a maximum movement distance of the at least one axial securing element relative to the main body of the at least one securing unit.

6. The grinding device as claimed in claim 1, wherein the at least one receiving unit includes at least one torque-transmitting element adjacent to a receiving recess in which the at least one securing unit at least partially engages, said torque-transmitting element being configured to interact with a torque-transmitting projection of the portable machine tool when the at least one receiving unit is arranged on the output unit of the portable machine tool.

7. The grinding device as claimed in claim 1, wherein the at least one receiving unit includes at least one torque-transmitting element, which has at least one bearing face at least substantially parallel to a radial direction of the at least one receiving unit.

8. The grinding device as claimed in claim 1, wherein:
the at least one receiving unit defines at least one receiving recess in which the at least one securing unit at least partially engages, and
the at least one receiving unit includes at least one edge region at least partially delimiting the receiving recess, the at least one edge region including at least one contact face configured to transmit at least one of a drive force and a drive torque to the at least one securing unit.

9. The grinding device as claimed in claim 1, wherein:
the at least one receiving unit defines at least one positioning recess configured for positioning the at least one securing unit, and
the at least one positioning recess is arranged adjacent to a receiving recess defined in the at least one receiving unit, the receiving recess at least partially delimited by at least one edge region of the at least one receiving unit, said at least one edge region being configured to transmit at least one of a drive force and a drive torque to the at least one securing unit.

10. The grinding device as claimed in claim 1, wherein the at least one securing unit includes at least one form-fitting element configured to transmit at least one of a drive force and a drive torque to the at least one grinding apparatus.

11. The grinding device as claimed in claim 10, wherein the at least one form-fitting element is arranged on a clamping face of the at least one securing unit which is configured to be placed against the at least one grinding apparatus to axially fix the at least one grinding apparatus on the at least one receiving unit and/or on the output unit.

12. A grinding device as claimed in claim 1, wherein:
the portable machine tool is a grinding machine,
the grinding device is a grinding-disk device or a backup-pad device,
the at least one grinding apparatus includes at least one grinding wheel, and
the at least one receiving unit is a grinding disk or backup pad.

13. The grinding device as claimed in claim 1, wherein the at least one receiving unit is configured to be fixed in a thread free manner on the output unit.

14. The grinding device as claimed in claim 1, wherein an axis of movement of the at least one axial securing element runs parallel to an axis of rotation of the at least one securing unit.

15. A grinding apparatus comprising:
a grinding wheel configured to be fixed on a grinding machine by a grinding device that comprises:
a receiving unit configured to be fixed on an output unit of the grinding machine and by which the grinding apparatus is arranged on the receiving unit; and
a securing unit configured for axially fixing the receiving unit and/or the grinding apparatus on the output unit of the grinding machine,
wherein the securing unit is configured to axially fix the grinding wheel on the output unit of the portable machine tool in a tool-free manner with the grinding wheel clamped between the securing unit and the output unit, and/or to axially fix the grinding wheel on the receiving unit in a tool-free manner with the grinding wheel clamped between the securing unit and the receiving unit,
wherein the securing unit is configured to couple to and de-couple from the receiving unit in a tool-free manner, and
wherein the securing unit comprises an axial securing element, which is mounted movably on a main body of the securing unit.

16. The grinding apparatus as claimed in claim 15, further comprising:
at least one coupling unit configured to connect to the securing unit of the grinding device,
wherein the coupling unit has at least two differently designed connecting elements configured as connecting recesses to connect with the securing unit.

17. The grinding apparatus as claimed in claim 16, wherein
the at least two differently designed connecting elements have different maximum width extensions,
the securing unit includes at least one axial securing element, and
an axis of movement of the at least one axial securing element runs parallel to an axis of rotation of the securing unit.

18. An insert tool comprising:
a grinding apparatus; and
a grinding device comprising:
a receiving unit configured to be fixed on an output unit of a portable machine tool and by which the grinding apparatus is arranged on the receiving unit; and
a securing unit configured for axially fixing the receiving unit and/or the grinding apparatus on the output unit of the portable machine tool,
wherein the securing unit is configured to axially fix the grinding apparatus on the output unit of the portable machine tool in a tool-free manner with the grinding apparatus clamped between the securing unit and the output unit, and/or to axially fix the grinding apparatus on the receiving unit in a tool-free manner with the grinding apparatus clamped between the securing unit and the receiving unit,
wherein the securing unit is configured to couple to and de-couple from the receiving unit in a tool-free manner, and
wherein the securing unit comprises an axial securing element, which is mounted movably on a main body of the securing unit.

19. A machine tool system, comprising:
at least one insert tool as claimed in claim 18,
wherein
the at least one portable machine tool is configured as a grinding machine,
the at least one portable machine tool includes an output unit and a quick-release clamping device,
the at least one insert tool is fixable on the output unit of the portable machine tool by means of the quick-release clamping device, an axis of movement of the at least one axial securing element runs parallel to an axis of rotation of the securing unit.

20. A grinding device comprising:

a receiving unit configured to be fixed on an output unit of a portable machine tool and by which a grinding apparatus is arranged on the receiving unit; and a securing unit configured for axially fixing the receiving unit and/or the grinding apparatus on the output unit of the portable machine tool, the securing unit having an axis of rotation, wherein the securing unit is configured to axially fix the grinding apparatus on the output unit of the portable machine tool in a tool-free manner with the grinding apparatus clamped between the securing unit and the output unit, and/or to axially fix the grinding apparatus on the receiving unit in a tool-free manner with the grinding apparatus clamped between the securing unit and the receiving unit, an axis of movement of at least one axial securing element runs at least essentially parallel to the axis of rotation of the securing unit, and wherein the securing unit comprises an axial securing element, which is mounted movably on a main body of the securing unit.

* * * * *